United States Patent [19]

Nigawara et al.

[11] Patent Number: 5,414,798
[45] Date of Patent: May 9, 1995

[54] KNOWLEDGE INFORMATION GENERATING SYSTEM

[75] Inventors: Seiitsu Nigawara; Shigeaki Namba; Masayuki Fukai, all of Hitachi, Japan

[73] Assignee: Hitachi, Ltd., Tokyo, Japan

[21] Appl. No.: 460,093

[22] PCT Filed: Jun. 17, 1988

[86] PCT No.: PCT/JP88/00597
§ 371 Date: Jan. 29, 1990
§ 102(e) Date: Jan. 29, 1990

[87] PCT Pub. No.: WO89/12852
PCT Pub. Date: Dec. 28, 1989

[51] Int. Cl.⁶ .................. G05B 23/02; G05B 13/00
[52] U.S. Cl. ........................... 395/75; 395/51; 395/906
[58] Field of Search ........... 364/513; 395/68, 75, 395/906, 51

[56] References Cited

U.S. PATENT DOCUMENTS

| | | | |
|---|---|---|---|
| 4,517,468 | 5/1985 | Kemper et al. | 290/52 |
| 4,658,370 | 4/1987 | Erman et al. | 364/513 |
| 4,920,499 | 4/1990 | Skeirik | 364/513 |
| 4,931,951 | 6/1990 | Murai et al. | 364/513 |

*Primary Examiner*—Robert W. Downs
*Attorney, Agent, or Firm*—Antonelli, Terry, Stout & Kraus

[57] ABSTRACT

A knowledge information generating system including: a fundamental rule storage for making and storing, for each process data to be controlled, another process data relating to the former and the relations between these process data in advance as fundamental rules; a process data input processor for inputting and storing the process data to be controlled; a knowledge information collection necessity decider for detecting that the process data obtained from the process data input processor have changed or deviated from a predetermined relation; a knowledge information editor for fetching the fundamental rules relating to the process data, which are decided to be collected by the knowledge information collection necessity decider, from the fundamental rule storage, to edit the process data on the basis of the relations between the data group stored in the process data input processor and the process data stored in the fundamental rules; and a knowledge data base for storing the knowledge information obtained from the knowledge information editor.

9 Claims, 19 Drawing Sheets

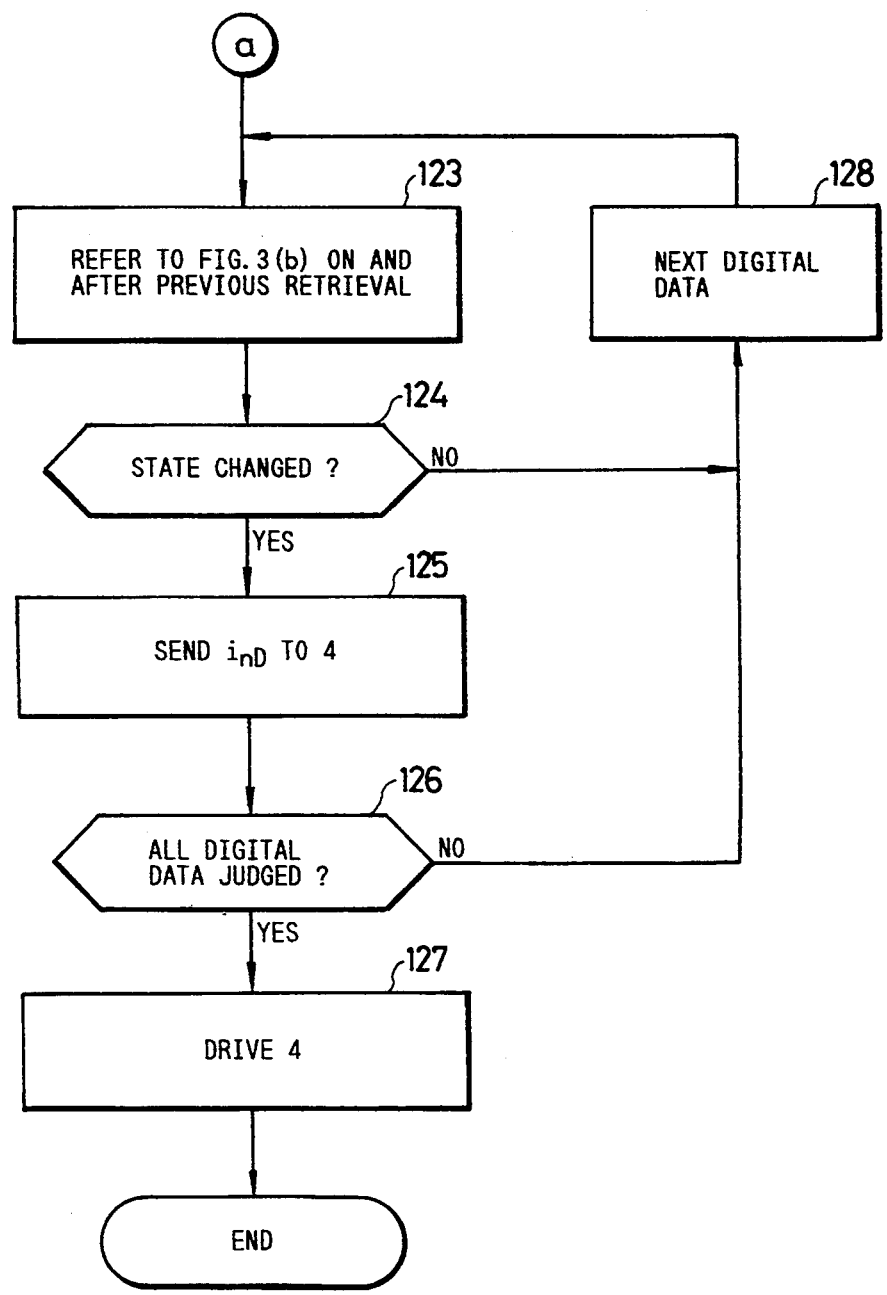

| INPUT | CORRELATED | RELATIONS |
|---|---|---|
| $i_{1A}$ | — | UPPER LIMIT  $k$ (Kg/cm²) |
| $i_{2A}$ | $i_{10A}$ | UPPER LIMIT  $m i_{10A}$<br>LOWER LIMIT  $(m-2) i_{10A}$ |
|  | $i_{13A}$ | UPPER LIMIT  $n i_{13A} + a$<br>LOWER LIMIT  $n i_{13A} - b$ |
| $i_{3A}$ | — | UPPER LIMIT  $\ell$ (V) |
| $i_{4A}$ | $i_{8A}, i_{9A}$ | $i_{4A} = i_{8A} + i_{9A}$ |

$P_1 \geq P_2 \geq P_3 (P_3')$
$P_3 \geq P_4 \geq P_6$ $T_1 \geq T_2 \geq T_3 (T_3')$
$T_3 \geq T_4 \geq T_6$ Ta > Tb          Tc > Tb FIG. 7(a)
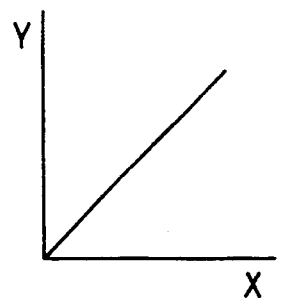
FIG. 7(b)
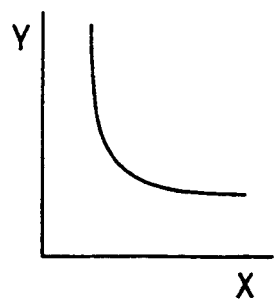
FIG. 7(c)
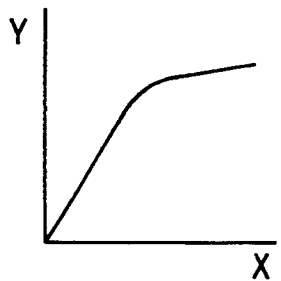
FIG. 7(d)
| X | Y | CORRELATION |
|---|---|---|
|   |   |   |
|   |   |   |
|   |   |   |
|   |   |   |

| (ABNORMAL PROCESS DATA BEING MONITORED) ||
|---|---|
| SOURCE OF INFLUENCE PROPAGATIONS | TARGET OF INFLUENCE PROPAGATIONS |
| 1<br>2<br>3 | a<br>b<br>c |

FIG. 9

| CASE | PLANT STATES | AUXILIARY STATES |
|---|---|---|
| INDIVIDUAL AUXILIARY | NORMAL | VALVE A-FULL OPEN |
| | ABNORMAL | VALVE A-FULL CLOSED |
| GROUP AUXILIARYS | NORMAL | VALVE A-FULL OPEN<br>VALVE B-FULL CLOSED |
| | ABNORMAL | VALVE A-FULL CLOSED<br>VALVE B-FULL OPEN |

FIG. 11

| NO | CLASSES OF SYSTEM PROCESS | FUNDAMENTAL RULES | CONCEPTS OF RULE EXTRACTION |
|---|---|---|---|
| 1 | INTRINSIC TO DEVICES | HEATER BLEEDING VALVE OPENED FULLY IN NORMAL RUN | D·FIG. 9 |
| 2 | BETWEEN DEVICES | HEATER EXIT/ENTRANCE VALUES OPENED EQUALLY | D·FIG. 9 |
| 3 | IN UNI-PROCESSES | NORMAL OPERATION: EXIT/ENTRANCE VALVES OPENED FULLY BYPASS VALVE CLOSED FULLY | D·FIG. 9 |
|  |  | ABNORMAL OPERATION: EXIT/ENTRANCE VALVES CLOSED FULLY BYPASS VALVE OPENED FULLY | D·FIG. 9 |
|  |  | WATER SUPPLY AT EXIT OF NO. (N) HEATER IS EQUAL TO THAT AT ENTRANCE AT CONSTANT WATER LEVEL | A·FIG. 6 |
| 4 | BETWEEN UNI-PROCESSES | SUPPLY WATER TEMP. AT NO. (N) HEATER EXIT < SUPPLY WATER TEMP. AT NO. (N+1) HEATER EXIT | A·FIG. 6 |
|  |  | SUPPLY WATER PRESS. AT NO. (N) HEATER EXIT > SUPPLY WATER PRESS. AT NO. (N+1) HEATER EXIT | A·FIG. 6 |
| 5 | IN SUB-PROCESSES | SUMMATION OF BLEED FLOWS OF HIGH PRESSURE HEATERS IN EQUAL AT CONSTANT WATER LEVEL TO DRAIN FLOW OF FINAL HIGH-PRESSURE HEATER | A·FIG. 6 |
|  |  | SUMMATION OF TEMP. RISES OF HIGH-PRESSURE HEATERS > Ts | B·FIG. 7 |
| 6 | BETWEEN UNI-PROCESSES |  |  |
| 7 | IN MAIN PROCESSES | WATER SUPPLY AT HIGH-PRESSURE HEATER EXIT IS LINEAR TO MAIN STEAM FLOW | B·FIG. 7 |
| 8 | BETWEEN MAIN PROCESSES | DURING HEATER CUT OPERATION GENERATOR OUTPUT MAY RISE 5% | B·FIG. 7 |
|  |  | SOURCE OF PROPAGATION (OPENING BLEEDER,...), TARGET OF PROPAGATION (MW,...) | C·FIG. 8 |

FIG. 12

| ABNORMAL PROCESS DATA | RULE NO. | RELATED PROCESS DATA | CORRELATIONS |
|---|---|---|---|
| $I_{1a}$<br><br>OPENING OF HEATER BLEEDER VALVE | $R_1$ | $I_{2a}, I_{4d}, I_{5d}, I_{3a}$<br><br>$I_{2a}$: BLEEDING FLOW OF HIGH-PRESSURE HEATER<br><br>$I_{4d}$: MASTER TRIP RELAY RESET<br><br>$I_{5d}$: ALARM RESET<br><br>$I_{3a}$: GENERATOR OUTPUT | |
| $I_{4a}$<br><br>SUPPLY WATER FLOW AT HIGH-PRESSURE HEATER EXIT | $R_2$ | $I_{4'a}$<br>$I_{5a}, I_{6a}, I_{7a}$<br><br>$I_{5a}$: MAIN STEAM FLOW<br>$I_{6a}$: MAIN STEAM PRESSURE<br>$I_{7a}$: MAIN STEAM TEMPERATURE<br>$I_{4'a} = \|I_{4a} - I_{5a} * I_{6a} * I_{7a}\|$<br>; FLOW DEVIATION | $\|I_{4a} - I_{5a} * I_{6a} * I_{7a}\|$<br>$\leq C_{4a} * I_{3a}$<br><br>$C_{4a}$: CONST. |
| | $R_3$ | $I_{8a}; I_{9a}$<br>$I_{8a}$: SUPPLY WATER FLOW AT HIGH-PRESSURE HEATER ENTRANCE<br>$I_{9a}$: WATER LEVEL OF HIGH-PRESSURE HEATER | $\|I_{4a} - I_{8a}\| \leq C_{9a} * I_{9a}$<br><br>$C_{9a}$: CONST. |

| DATA NAME | a | b | c | d | e |
|---|---|---|---|---|---|
| FUNDAMENTAL RULES | 1 | 1 | 1 | 1 | 1 |
| t | 1 | 1 | 1 | 1 | 0 |
| t+Δt | 1 | 1 | 1 | 0 | 0 |
| t+2Δt | 1 | 1 | 1 | 0 | 0 |
| t+3Δt | 1 | 1 | 1 | 0 | 0 |
| t+4Δt | 1 | 1 | 1 | 0 | 0 |
| t+5Δt | 0 | 0 | 0 | 0 | 0 |
| t+t' | 0 | 0 | 0 | 0 | 0 |

| DATA NAME | a | b | c | d | e |
|---|---|---|---|---|---|
| FUNDAMENTAL RULES | 1 | 1 | 1 | 1 | 1 |
| t | 1 | 1 | 1 | 1 | 0 |
| t+Δt | 1 | 1 | 1 | 0 | 0 |
| t+5Δt | 0 | 0 | 0 | 0 | 0 |

KNOWLEDGE INFORMATION GENERATING SYSTEM

TECHNICAL FIELD

The present invention relates to a system for automatically generating knowledge information relating to the operations of a variety of subjects of control from information of the running state of the subjects and, more particularly, to a system suitable for constructing a knowledge data base of a knowledge engineering applied expert system which can contribute to the operation of a large-scale subject of control composed of complicated processes.

BACKGROUND ART

In recent years, there have been widely developed, in various fields, a knowledge engineering applied expert system which makes use of the concept of AI (Artificial Intelligence). This system is intended to extract solutions or failures for an inquiry from the experiences already stored and to display and output them, or further, to control a variety of subjects by means of a computer. For realizing this system, the most serious problem resides in the difficulty of collecting past experiences of the experts or operators massively and accurately as knowledge. This cause will be examined in case the expert system is applied to the operation of a subject of control. 1. For experiences of medium- or large-scale accidents, records are complete, and the operator's memory is clear. Nevertheless, it is usual that small-scale accidents or minor events are neither recorded nor remembered clearly. 2. The operator himself to supply the knowledge is not convinced that his daily minor experiences are worth being stored in the computer so that they may be used as the knowledge of the expert system.

Here, the medium- or small-scale accidents are experienced a little, and these special events could not constitute an effective knowledge group. Since, moreover, the expert system to be applied to such a subject should ensure the operation without any accident, the knowledge should be collected from the rather minor events to be experienced in daily operation, such as the small-scale accidents.

There are known in the prior art several methods for collecting knowledge dictating how the expert himself reacts and behaves against the situations set by the computer. For example, Japanese Patent Laid-Open No. 60 - 203576 discloses an invention which is directed to a system for acquiring train rules for making a railway diagram. The knowledge engineer or expert himself simulates and displays the situation of an abnormal state (e.g., the disturbances of the diagram) by setting the abnormal state so that his knowledge may be smoothly extracted as if he actually faces the practical problem. Japanese Patent Laid-Open No. 59 - 167771 discloses a system for acquiring knowledge by creating "questions" for searching ultimate causes by use of the knowledge relations systemized by the structuring method and in cooperation with the specialists. However, this system finds it difficult to make the questions and is accompanied by a problem that it cannot acquire much knowledge information efficiently according to the real operation of the subject of control.

DISCLOSURE OF INVENTION

Therefore, the present invention has an object to provide a knowledge information generating system which can acquire much knowledge information efficiently according to the real operation of the subject of control.

In the present invention, the relations among the process data of a subject of control are grasped in advance and stored as fundamental rules, and these fundamental rules stored in connection with the process data are extracted from fluctuations of the process data inputted from the actual subject so that the more detailed relations among the process data are acquainted as knowledge from the change in the process data described in the fudamental rules and the process data acting as the trigger.

BRIEF DESCRIPTION OF DRAWINGS

FIGS. 6(a)–6(b), 7(a)–7(d), 8(a), 8(b), and 9 are diagrams showing the concepts for making the fundamental rules; FIG. 11 is a table enumerating the fundamental rules extracted in connection with the high-pressure heater set of the water-evaporation process of FIG. 10; FIG. 12 is a table enumerating the process data noting the fundamental rules of FIG. 11, together with the correlating process data and their correlations.

BEST MODE FOR CARRYING OUT THE INVENTION

The present invention can be applied to a variety of subjects of control such as subjects to be automatically or manually controlled, e.g., thermal or nuclear power plants, iron making plants, industrial plants or chemical plants. Vehicles to be automatically or manually controlled such as airplanes, vessels or electric cars are also covered by the control subjects to which the present invention can be applied.

In the present invention, moreover, the process data of individual portions of the control subject are fetched every moment to generate the knowledge information. In a developed mode of application, the knowledge information generated by the present invention is displayed through the operator to the outside or directly to the control unit to operate the control subject. In the various plants, a logger for recording the events occurring is used for aiding in making the daily reports by the operator. The events containing the correlations among the process data can be recorded by making use of the present invention so that the present invention can be used as an automatic daily report maker.

Before entering into the description of the present invention, a schematic system structure of the invention will be described with reference to FIG. 1.

Figure 1:
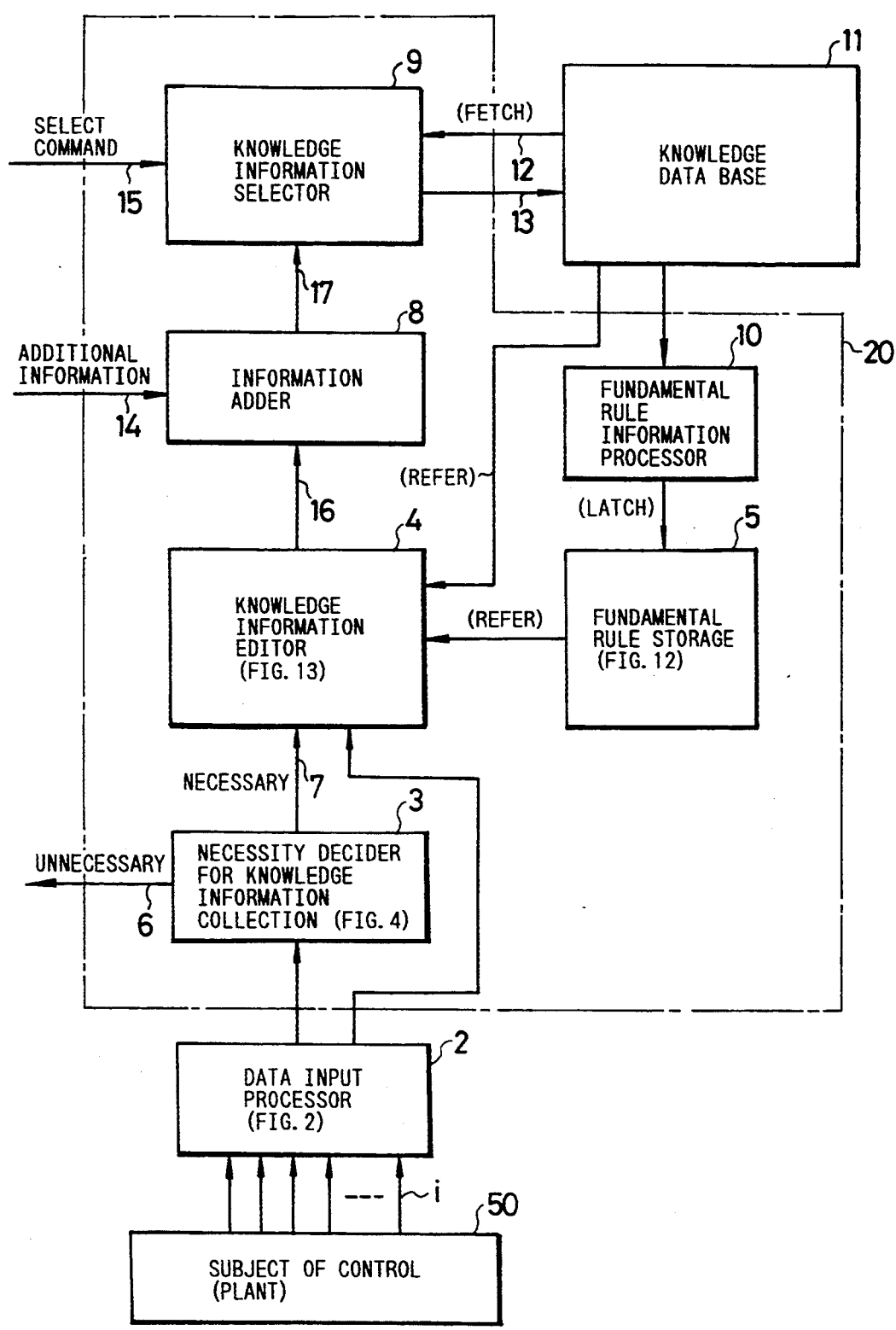
FIG. 1 is a schematic diagram showing the structure of the system of the present invention.

In FIG. 1, a portion 20 enclosed by single-dotted lines designates a knowledge information generating portion, which fetches the process data i of each portion of a subject of control 50 as its input information through a process data input processor 2 so that the knowledge information 13 of the so-called "if-then" form composed of a premise and a conclusion may be made and stored in a knowledge data base 11. This data base 11 is coupled to a not-shown control unit or display to output or display an output signal corresponding to the read command signal coming from the control unit so that it may be used in the so-called "artificial intelligence type control or expert system" or a knowledge engineering appliance. Moreover, the daily reports can be made from the outputs of the running knowledge data base. The control subject to be described hereinafter is exemplified by a plant, e.g., a thermal power plant. Here, the data input processor 2 is shown in more detail in FIG. 2, and the data structure obtained is shown in FIG. 3, as will be described hereinafter.

Figure 4:
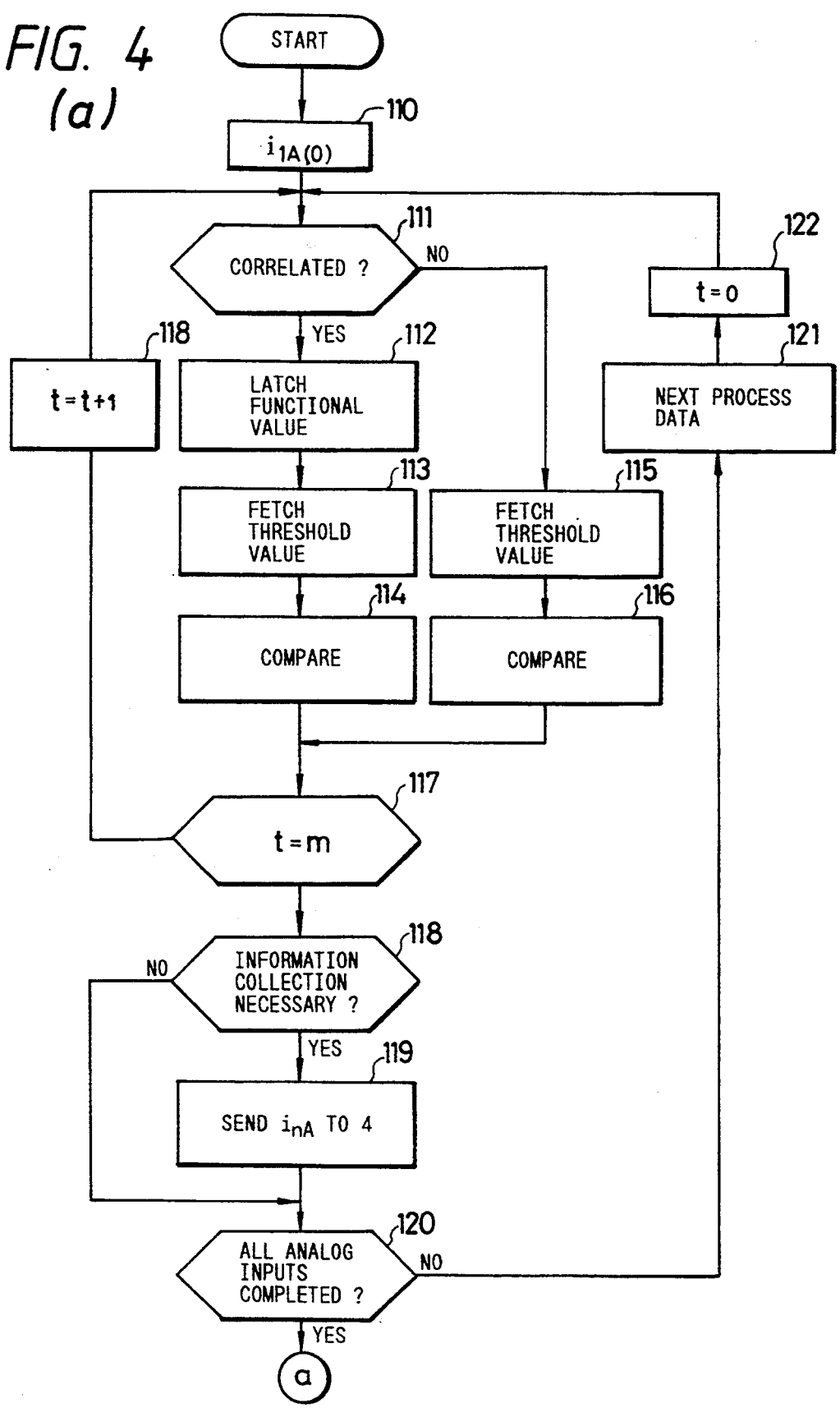
FIGS. 4(a) and 4(b) are a flow chart describing the concept of a knowledge information collection necessity deciding portion.
Figure 5:
FIG. 5 is a table to be used for deciding the discrepancy of the process data from the three-hold values.

In the knowledge information generating portion 20, a necessity decider 3 for knowledge information collection judges the opportunity of obtaining the knowledge information effective for the plant operation and feeds a collection necessary signal 7 to a knowledge information editor 4, if the analog data from the process data input processor 2 deviates a normal range or if the digital data is changed from "1" to "0" or vice versa. When there is neither deviation from the normal range nor any data change, the necessity decider 3 judges unnecessary 6 and starts no subsequent processing. The program of the processing of the necessity decider 3 is shown in FIG. 4, and the concept of deviation of the analog data is shown in FIG. 5.

Reference numeral 5 designates a process fundamental rule storage of the plant, which is recorded with the process fundamental rules known in advance in association with the flows of fluids and heat, the correlations among the process data, the influence propagation routes of the process data and the states of the auxiliaries, so that the process data are used as retrieval keys to read out the associated fundamental rules to the outside. FIGS. 6 to 10 show the concepts of extracting the fundamental rules in advance; FIG. 11 shows one example of the fundamental rules extracted according to those concepts; and FIG. 12 shows one example of the stored contents of the fundamental rule storage 5. Incidentally, the fundamental rules are not imagined in advance but are selected from the knowledge made by the system of FIG. 1. The fundamental rules are suitably extracted in a process fundamental rule information processor 10 and are stored in the fundamental rule storage 5.

The editor 4 is executed, if the collection is decided necessary by the necessity decider 3, to use the process data decided necessary as the key words so that it extracts the associated process data and the fundamental rules from the fundamental rule storage 5. A knowledge 16 is acquired by the processing of FIG. 13 in accordance with the process data set and the fundamental rules. This knowledge 16 may be stored as it is as the knowledge 13 in the data base 11. Nevertheless, the knowledge 16 may have its propriety evaluated by the experts or operators. For example, the expert's additional information 14 may be added to the knowledge 16 by an information adder 8 to generate a knowledge 17. This knowledge 17 is not registered as the knowledge 13 in the data base 11 in accordance with a select command 15 if it has been found in a knowledge information selector 9 that the knowledge 17 has already been registered in the data base 11 or is not effective as the knowledge.

The structures and operations of the individual units will be described in detail in the following.

I: Process Data Input Processor 2

Figure 2A:
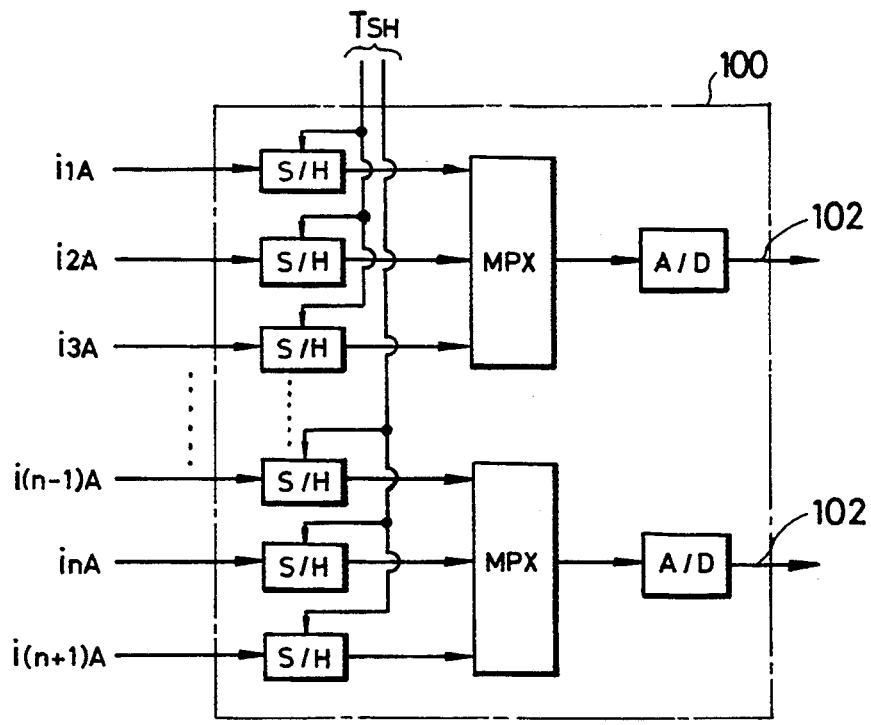
FIGS. 2(a) and 2(b) are a schematic diagram showing a process data input processing portion.
Figure 2B:
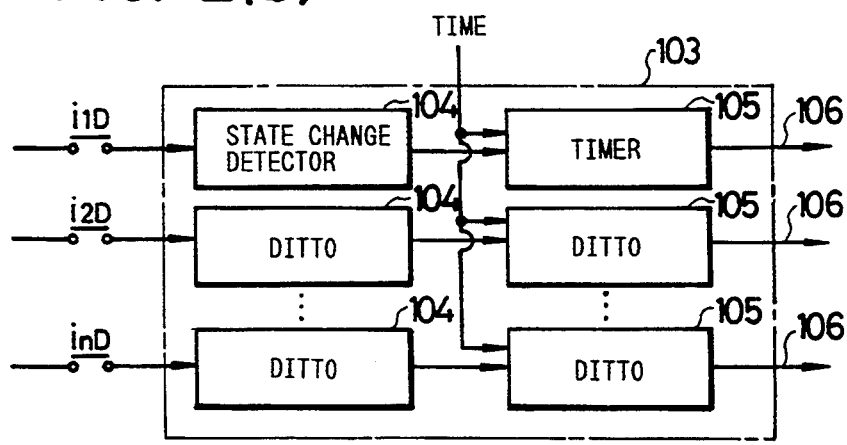

This processor has a schematic structure, as shown in FIG. 2. Of the process data of the plant, analog data $i_{1A}$ to $i_{nA}$ and $i_{(n+1)A}$ are inputted to an analog input processor 100 so that their instant values are first sampled and held in synchronism with a sampling command signal $T_{SH}$ in sample holders S/H. Here, the process data are for long and short periods and are sample-held for suitable periods, if necessary. The sample-held data are sequentially extracted by multiplexers MPX and are converted to digital values by analog-digital converters AD until they are outputted from the analog input processor 100 as signals 102 paired of the sample held values and the process data names. On the other hand, the digital data $i_{1D}$ to $i_{nD}$ of the process data are inputted to a digital input processor 103, as shown in FIG. 2(b). It is detected by state change detectors 104 that the digital data have been changed from "1" to "0" or vice versa. Timers 105 output signals 106 in which the state change detection time, the data value (1 or 0) and the process data names are paired.

Figures 3A, 3B:
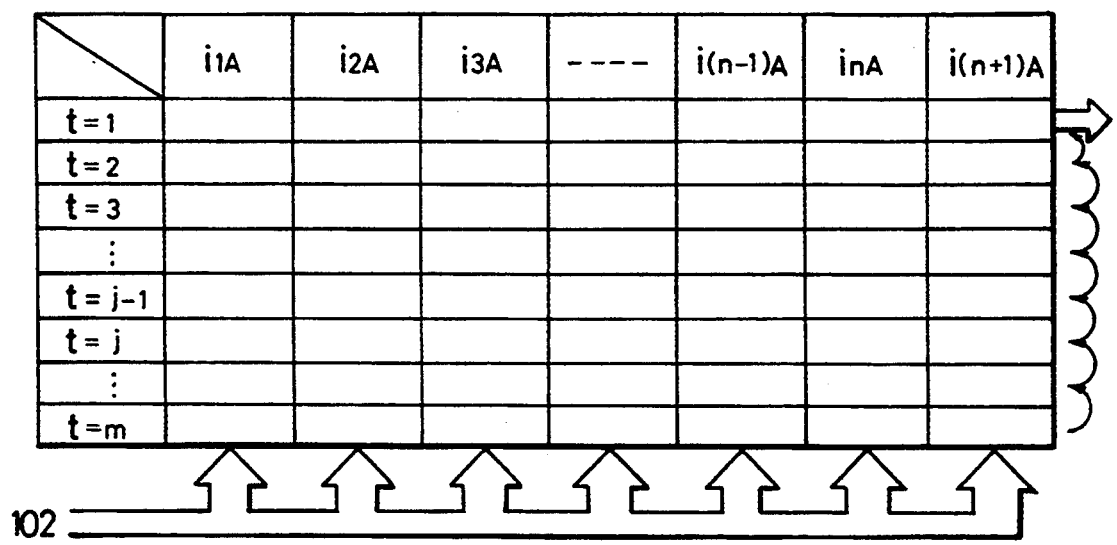
FIGS. 3(a) and 3(b) are a diagram showing the stored situation of a buffer memory for storing the data obtained by the processing portion of FIG. 2.

The signals 102 or 106 thus detected are temporarily stored, as shown in FIG. 3, in a buffer memory disposed in the process data input processor 2. In the case of the analog data, as shown in FIG. 3(a), the analog values at the individual sampling times (t=1, 2, - - -, j−1, j+1, - - -, m) are stored for each process data. In the sampling time t, t=m means the latest time, and t=1 means the earliest time. The signals 102 coming from the input unit 100 of FIG. 2 are stored in the t=m areas having the corresponding process data names. The old data in the t=m areas are shifted to the (m−1) positions, and these shifts are accomplished sequentially for all the data until the earliest data in the t=1 areas are finally disposed. For the data stored in the buffer memory, a series (t=1 to m) of the data having the names of the process data designated can be read out all at once, and the individual data can also be read out by designating the process data names and the times. FIG. 3 (b) shows the a buffer memory for storing the digital data such that the digital data values and the state change detection times are stored in pairs for each process data. In this case, the data are stored in the buffer memory only at the state change, and the data are extracted from the buffer memory by designating the process data name.

II: Necessity Decider 3 for Knowledge Information Collection

FIG. 4 presents a flow chart for describing the concept of this necessity decider. This flow chart is started by a knowledge making command coming from either the operator or a not-shown suitable unit. First of all, at Block 110, the analog data $I_{1A}(=I_{1A(1)})$ at the time t=1 is designated and is read out from the buffer memory of FIG. 3(a).

In Blocks 111 to 116, the analog value $i_{1A(1)}$ is compared with the threshold value with reference to the Table of FIG. 5. The functions of these blocks will be described in the following. In case process data X and Y have correlations, generally speaking, the process data Y should be within a range determined by the data X. For example, if the data Y is in a proportional relation expressed by Y=kX (k: a constant), its value should normally satisfy the range of $kX-a<Y<kX+b$ (where a and b are constants). If the data Y deviates this range, it is possible to consider that a singular event has occurred. Noting this singlar phenomenon of the process data, the present invention contemplates generating knowledge effective for running the plant. The Blocks 111 to 116 are used to judge the presence of the singular phenomenon of the analog data, and Table shown in FIG. 5 is prepared for the judgement. This Table is stored, for all the analog data inputted, with the presence of the correlations other process data, the corresponding process data names, if correlated, and the correlations.

The functions of the Blocks 111 to 116 will be described in more detail with reference to FIG. 5. At the Block 111, it is judged from the Table of FIG. 5 whether or not the input process data $i_{1A}$ are correlated. If NO, the threshold value k (Kg/cm$^2$) at the upper limit is fetched from the column of the relations of the Table of FIG. 5. At the Block 116, the threshold value k is compared with the process data $i_{1A}$. At Block 117, it is decided that all the analog data (from t=1 to t=m of FIG. 3(a)) have been checked. If NOT, the data $i_{1A}$ of a subsequent sample time is extracted for t=t+1, and the processing of the Blocks 111, 115 and 116 are repeated. If the data of t=m is executed for the data $i_{1A}$, it is decided at the Block 118 whether or not there is a deviation from the threshold value. If YES, the necessity for the knowledge information collection in association with the process data is sent to the knowledge information editor 4 at Block 119. At Block 120, it is confirmed that all the analog data have been judged. If NOT, a next process data is designated at Block 121, and the processings thus far specified are repeated for t=0 at Block 122. Incidentally, the process data may have correlations, as $i_{2A}$ or $i_{4A}$, with other process data. This case will be described in connection with the process data of $i_{2A}$. It is confirmed at the Block 112 with reference to the Table of FIG. 5 that the data $i_{2A}$ is correlated with the data $i_{10A}$ and $i_{13A}$. These data values $i_{10A}$ and $i_{13A}$ are fetched from the buffer memory (FIG. 3(a)) in the process data input processor 2 of FIG. 1. At the Blocks 113, the relations of FIG. 5 are referred to in order to calculate the threshold values (i.e., the upper limit m·$i_{10A}$ and the lower limit (m−2)·$i_{10A}$ for the data value $i_{10A}$, and the upper limit n·$i_{13A}$+a and the lower limit n·$i_{13A}$−b for the data value $i_{13A}$). At the Block 114, the relations of (m−2)·$i_{10A}<i_{2A}<$m·$i_{10A}$ are calculated with the value $i_{10A}$, and the reltions of n·$i_{13A}-$b$<i_{2A}<$n·$i_{13A}$+a are calculated with the value $i_{13A}$. If the value $i_{2A}$ deviated from those ranges, it is judged at the Block 118 that the knowledge information collection is necessary, and this necessary signal 7 is sent to the knowledge information editor 4 of FIG. 1.

The procedures thus far described are directed to the case of the analog process data. The routine of FIG. 4 (b) is executed in the case of the digital data. At first Block 123, the contents of the digital data $i_{nD}$ stored in the buffer memory of FIG. 3(b) of the data input processor 2 of FIG. 1 are read out. At Block 124, it is judged whether or not the state is changed for a predetermined period (to the present on and after the preceding knowledge edition, for example). If YES, the name and the change time of the data are sent out (at Block 125) to the information editor 4 of FIG. 1. If it is judged at the Block 124 that there was no change and if all the digital data are not judged at Block 126, next digital data are checkd at Block 128. The editor 4 is driven when all the analog data and all the digital data are confirmed, for example.

III: Fundamental Rule Storage 5

It causes an abnormal phenomenon in the plant or process that the analog data deviate from the threshold value or that the state is changed in the digital data. The present invention acquires knowledge by noting the process data having caused the abnormal phenomena. More specifically, the relations between the abnormal process data and influencing (or influenced) process data or correlated process data (both of which will be called together the "correlated process data") are extracted as much as possible and are stored in advance in the fundamental rule storage 5. These fundamental rules are proportionally related between the process data a and b, of which the data a are so abstract as are changed as a result of the data b. The knowledge information editor 4 further modifies the fundamental rules to specify the constant of proportion or to determine the delay time between the process data. Before the description of the knowledge information editor 4, the fundamental rule storage 5 will be described as follows.

Although the fundamental rules specify the relations between the abnormal process data and the correlated process data, as has been described hereinbefore, it is not easy in fact to generate the fundamental rules in advance. The considerations from the following points should be taken into the preparations of the fundamental rules.

A) The flow directions of the fluid and heat in the process should be noted:

The process never fails to have flow directions. In the ordinary plant, fluids such as water, steam, oil or gas and the flows of heat or electricity are conceived, and the correlations following these flows are ruled. The flow rates, pressures, temperatures and heats will be described in the following. FIG. 6 shows the piping system taken up as a subject of control. A fluid source at a high temperature and under a high pressure is disposed at the lefthand side of FIG. 6, and a flud consuming portion is branched at the righthand side. If the piping system is thus simplified, the following relations are held among the flow rates, pressures and temperatures at the individual points I to IX.

Flow Rates: The summation of the inflow and outflow at the branch point is always equal. As shown in FIG. 6 (b), the flow rates Qa to Qe of the individual portions are always satisfied by Qa=Qb+Qc and Qc=Qd+Qe. In case the summation of the outflow is smaller than the inflow, there occurs an abnormal event that a leakage is caused upstream of the flow detection point downstream of the branch point. In case the inflow is smaller, it informs that an abnormal event has caused another inflow from a different system.

Pressures: The detected pressure value (limited to the system of no pumping action) at upstream sides is always higher than that at downstream sides because the pressure loss due to the flow velocity. As shown in FIG. 6 (c), there hold the correlations of $P_1 \geq P_2 \geq P_3(P_3')$ and $P_3 \geq P_4 \geq P_6$. If these relations are not satisfied, the flow directions are abnormal. Then, the flow rates are checked, and the abnormal information is produced.

Temperatures: A fluid never flows without exchanging heat with the external system. A heat inflow from the external system occurs in case a cold fluid is handled, and a heat outflow into the external system occurs in case a hot fluid is handled. FIG. 6 (d) exemplifies the latter case, in which there hold the correlations of $T_1 \geq T_2 \geq T_3$ ($T_3'$) and $T_3 \geq T_4 \geq T_6$.

Figure 6A:
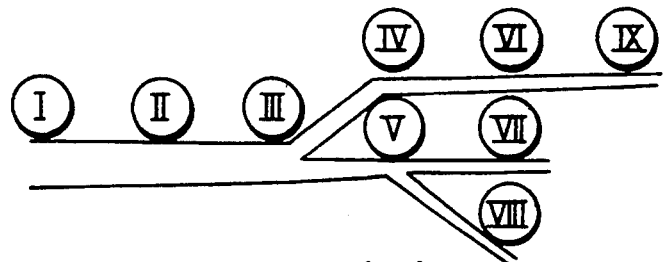
Figure 6B:
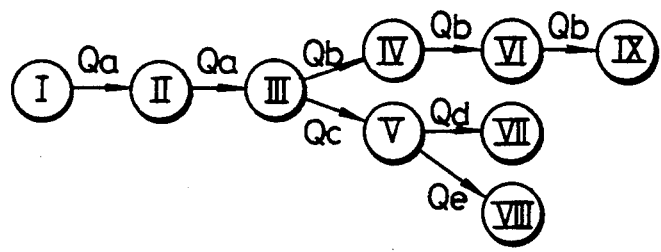
Figure 6C:
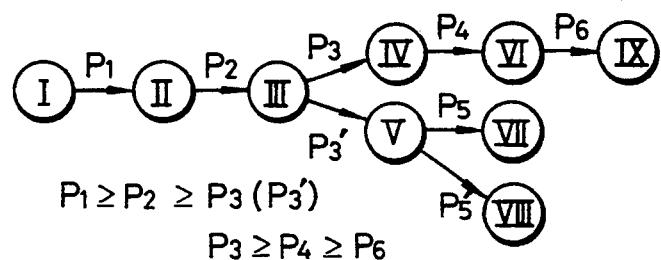
Figure 6D:
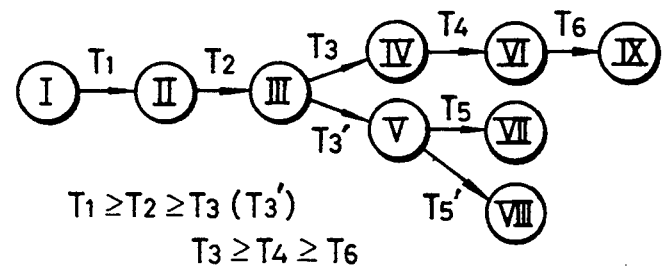
Figure 6E:
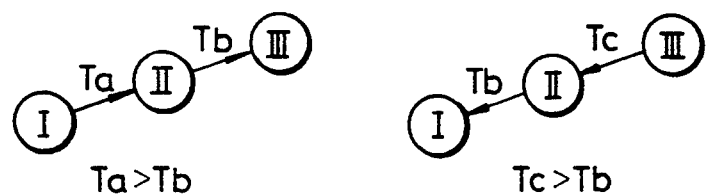

Heats: Even without any fluid medium, a temperature difference, if any, will never fail to cause the heat transfer in a direction to augment the entropy. In a plant constituting device made of a thick metal material, it is important to monitor the thermal stress due to the temperature difference between the inner and outer walls of the metal material. The heat transfer can be deduced for each running condition, as shown in FIG. 6(e), and there hold the correlations of $Ta > Tb$, $Tc > Tb$, or $Ta - Tb$ the set value, $Tc - Tb <$ the set value. If these correlations are broken, it is possible to produce information of the abnormality.

B) The correlations between the process data should be noted (with reference to FIG. 7):

The process data are essential for administering and controlling the qualities of the final process amounts to be produced in the plant. Important ones of the correlations among the primary and secondary production process amounts for the material inputs, the specific parameters and the final process amounts are noted. For two process data having correlations such as linear, inversely proportional and saturation characteristics, as shown in FIGS. 7(a) to 7(c), the dependent-variable process data Y corresponding to the measured values of the independent-variable process data X are tabulated together with the correlations, if possible, in the tabular form of FIG. 7(d).

Figures 8A, 8B:
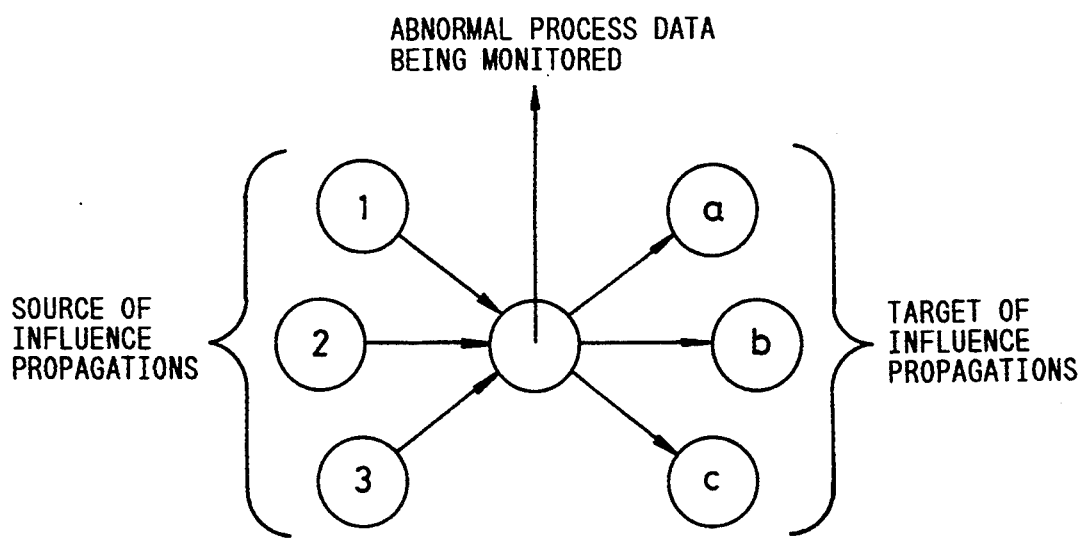

C) The influence propagation route of the process data should be noted (as shown in FIG. 8):

If some process data are noted, their relating other data are imagined. These imagined data to be considered are divided into two groups, i.e., the data group acting as a source of influence propagations of the process data being noted and the data group acting as a target of the influence propagations.

D) The states of the auxiliaries should be noted (as shown in FIG. 9):

The running states of the plant and the individual auxiliaries are closely related especially when the plant goes out of order. Therefore, the operating states of the individual auxiliaries in the normal and abnormal cases of the plant are noted and are edited into fundamental rules individually or for each group. FIG. 9 exemplifies the cases in which the individual auxiliary (i.e., the valve A only) is checked and in case the two auxiliaries (i.e., the valves A and B) are checked.

Several concepts for extracting the fundamental rules of the plant have been explained hereinbefore. For the larger-scale plant, it is the more difficult to extract the fundamental rules efficiently without any exception. Next, a concept of extracting the fundamental rules efficiently without any exception will be described in the following in connection with a thermal power plant.

Figure 10:
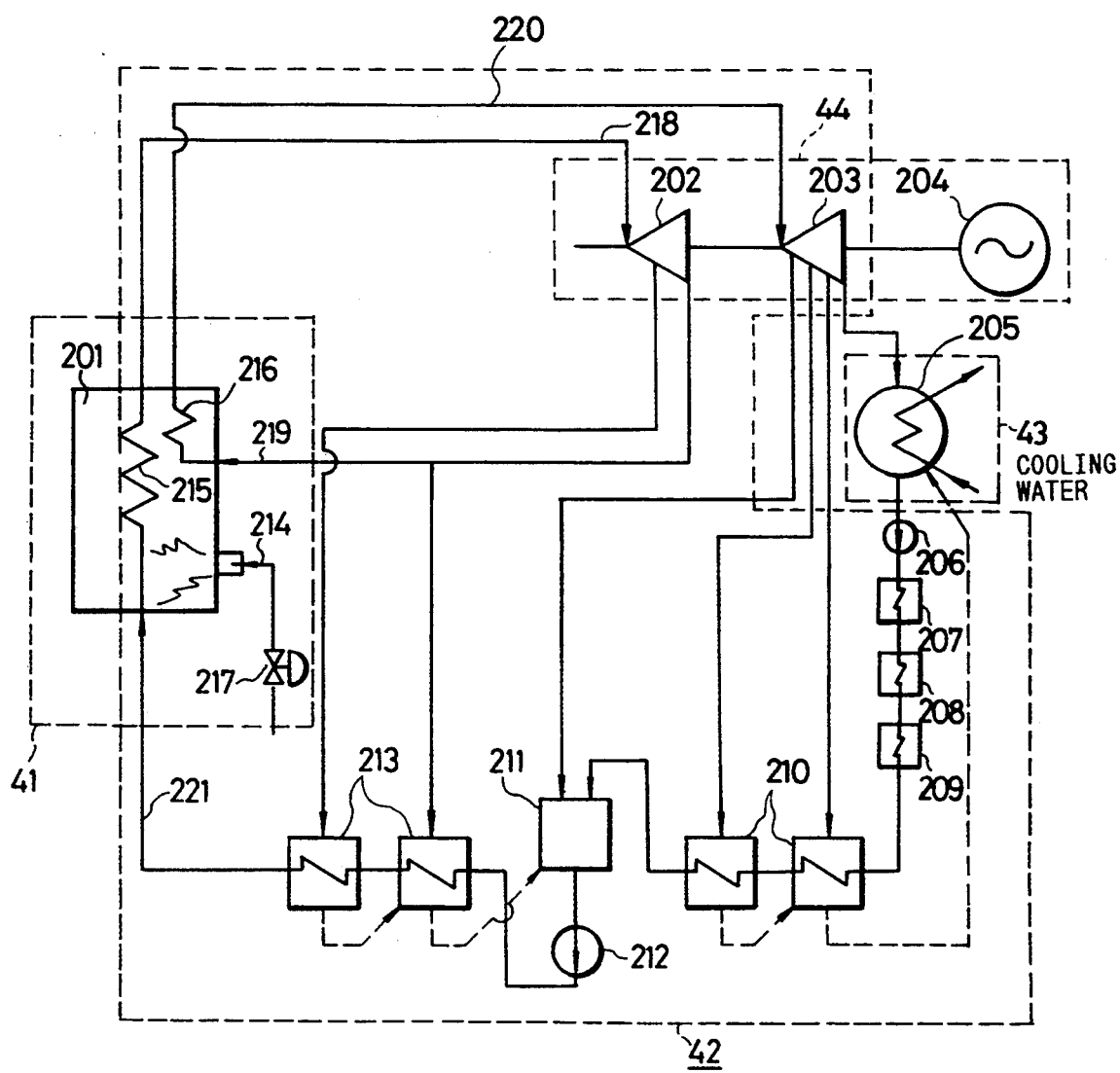
FIG. 10 is a schematic diagram showing a thermal power plant which is exemplified for explaining the concept of extracting the fundamental rules.

FIG. 10 is a schematic flow diagram showing the thermal power plant taken up as an example. In FIG. 10, steam generated by a boiler 201 is supplied through a main steampipe 218 to a high-pressure turbine 202, in which the heat energy of the steam is partially transformed into mechanically rotating energy for rotating a generator 204. The steam having worked in the high-pressure turbine 202 is heated again through a cold reheating steam pipe 219 by a reheater 216 and is guided through a hot reheating steam pipe 220 into a reheating turbine 203 so that it may work again. The steam having worked in the reheating turbine 203 flows as an exhaust into a condenser 205 so that it is cooled into water by cooling water such as brine. The water thus condensed is pumped up by a condenser pump 106 so that its heat is recovered through individual heat exchangers such as a condensing heat exchanger 207, an air bleeder 208 and a ground condenser 209. The condensed water is heated by a low-pressure water supply heater 210 and a bleeder 211. The water having its pressure boosted by a boiler water supply pump 212 is further heated by a high-pressure water supply heater 213 until it is fed to the boiler 201 through a main water supply pipe 221. The water in the high-pressure water supply heater 213, the bleeder 211 and the low-pressure water supply heater 210 are heated by bleeding the turbine. In the boiler, on the other hand, the fuel is controlled by a fuel regulator valve 217 and is burned with a necessary amount of air in a fuel burner 214. The supplied water is heated into steam by the radiation of the combustion, and this steam is overheated by an overheater 215 and sent to the turbine.

The thermal power plant can be expressed, if classified in connection with the process or the energy carrier, into four major processes, i.e., the water-steam system 42, the air-gas-fuel system 41, the turbine-electric system 44 and the cooling water system 43. The processes thus classified can be made to correspond to the components of FIG. 10, i.e., the zones enclosed by single-dotted lines in FIG. 10. The water-steam system has a range containing the heat-exchanging function of the boiler and the heat consuming function of the turbine in the system. This major process noting the flow of the substance or the energy carrier can be further classified into several sub-processes sharing the flow processes inclusive. In the water-steam system 42, for example, there are enumerated the low-pressure heater group, the high-pressure heater group, the boiler and the turbine. These sub-processes contain the set of the devices for realizing the flow processes shared, and think of the set as a uni-process. By dividing the power plant to the level of the auxiliaries, moreover, the whole plant can be grasped by one side. Here, the devices in the case of the high-pressure heater are the high-pressure heater, the exit, the input valve, the bypass valve, and the bleeding valve.

Thus, the fundamental rules can be extracted efficiently without any exception by classifying the whole power plant finely into the main processes, sub-processes, the uni-processes and the devices and by sequentially extracting the relations between the fine levels or the rank levels. FIG. 11 enumerates the events of the fundamental rules, which are extracted in connection with the high-pressure heater group of the water-steam system, and the relations among the classes of system process, the fundamental rules extracted, and the concepts of rule extraction, as has been described with reference to FIGS. 6 to 9. The description will be described in the following with reference to FIG. 11.

Event 1: Fundamental Rules of Device Level (Intrinsic to Devices)

These fundamental rules are related to the states of the auxiliaries of the fundamental rule extraction kind D and make it a rule that the heater bleeding valve is fully open at all times in the normal run of the plant.

Event 2: Fundamental Rules of Device Level (between Devices)

These fundamental rules are related to the states of the auxiliaries of the fundamental rule extraction kind D and make it a rule that the exit and entrance valves of the heater are equally open and closed on condition that the devices belonging to one set of the high-pressure heater are correlated. A negligible time difference, if any, in the open states of the two valves is eliminated.

Event 3: Fundamental Rules of Uni-Process level (in Uni-Processes)

These fundamental rules are composed of two kinds, i.e., those related to the states of the auxiliaries of the fundamental rule extraction kind D and those related to the flow direction of the process A. The former makes it a rule that the exit/entrance valves are fully open whereas the bypass valve is fully closed in the normal run of the plant and that the exit/entrance valves are fully closed whereas the bypass valve is fully open in an expectable abnormal run of the plant. The latter makes it a rule that the water supply at the heater exit is equal to that at the heater entrance at a constant heater water level.

Event 4: Fundamental Rules of Uni-Process level (between Uni-Processes)

These fundamental rules are related to the process flow direction of the fundamental rule extraction kind A and make it a rule that the supply water temperature at the heater exit is lower than that of a subsequent (or downstream) stage and that the supply water pressure at the heater exit is higher than that of a subsequent stage. These are rules based upon the heat exchange and flow pressure loss in the water supply lines around the high-pressure heater.

Event 5: Fundamental Rules of Sub-Process level (in Sub-Processes)

These fundamental rules are related to the process flow direction of the fundamental rule extraction kind A and make it a rule that the summation of bleed flows of high-pressure heaters is equal, at a constant water level, to the drain flow of the final high-pressure heater. The fundamental rules are also related to the correlations among the process data of the fundamental rule extraction kind B and make it a rule that the summation of temperature rises of the high-pressure heaters is larger than a predetermined value. It is seen at one side that there is no heat balance in the total calories to be exchanged in the high-pressure heaters.

Event 6: Fundamental Rules of Sub-Process level (between Sub-Processes)

There is no rule to be especially provided.

Event 7: Fundamental Rules of Main Process level (in Main Processes)

These fundamental rules are related to correlations among the process data of the fundamental rule extraction kind B and make it a rule that linear relations are present between the water supply at the high-pressure heater exit and the main steam flow. These rules monitor the relations of the water and steam in the water-steam process from the view point of the plant performances.

Event 8: Fundamental Rules of Main Process level (between Main Processes)

These fundamental rules are related to correlations among the process data of the fundamental rule extraction kind C and make it a rule that the generator output may rise by 5% during the heater cut operation of the plant. This means that the correlations of the major data of the plant may be changed under a running condition in different processes.

As has been described hereinbefore, several kinds of fundamental rules have been enumerated in connection with the high-pressure heater. It is, however, unnecessary to make the rules in which the differences in and between the classified processes are indefinite or overlapped.

The individual fundamental rules thus extracted are tabulated in FIG. 12 and stored in the fundamental rule unit of the automatic plant running information generating system. FIG. 12 shows a portion of the fundamental rules extracted, as tabulated in FIG. 11, such that the abnormal process data, the related process data and the correlations are stored as one information set in the form of a defining Table. For example, the rule $R_1$ is the content described at "1" in FIG. 11, and dictates that the high-pressure heater bleeding flow $I_{2a}$, the master trip relay reset signal $I_{4d}$, the alarm reset signal $I_{5d}$ and the dyanmo output signal $I_{3a}$ should be monitored as the related process data relating to a heater bleeder valve opening signal $I_{1a}$ or the abnormal process data. The normal run is judged if $I_{2a}$ and $I_{3a}$ are larger than predetermind values and if $I_{4d}$ and $I_{5d}$ are reset. The rules $R_2$ and $R_3$ are the contents described in "7" and "3" of FIG. 11 and are two independent rules which are determined in connection with the supply water flow $I_{4a}$ at the high-pressure heater exit. Of these, the rule $R_2$ dictates that the main steam flow $I_{5a}$, the main steam pressure $I_{6a}$ and the main steam temperature $I_{7a}$ should be monitored as the related process data, and that the relations of $|I_{4a}-I_{5a}\times I_{6a}\times I_{7a}| \leq C_{4a}\times I_{3a}$. Here, $C_{4a}$ is a constant. The other rule $R_3$ dictates that the supply water flow $I_{8a}$ at the high-pressure heater entrance and the water level $I_{9a}$ of the high-pressure heater should be monitored as the related process data, and that the relations of $|I_{4a}-I_{8a}| \leq C_{9a}\times I_{9a}$ ($C_{9a}$: a constant). Although not described in FIG. 12, the descriptions of the fundamental rules of FIG. 11 are made in relation to the process data.

IV: Knowledge Information Editor 4

Figure 13:
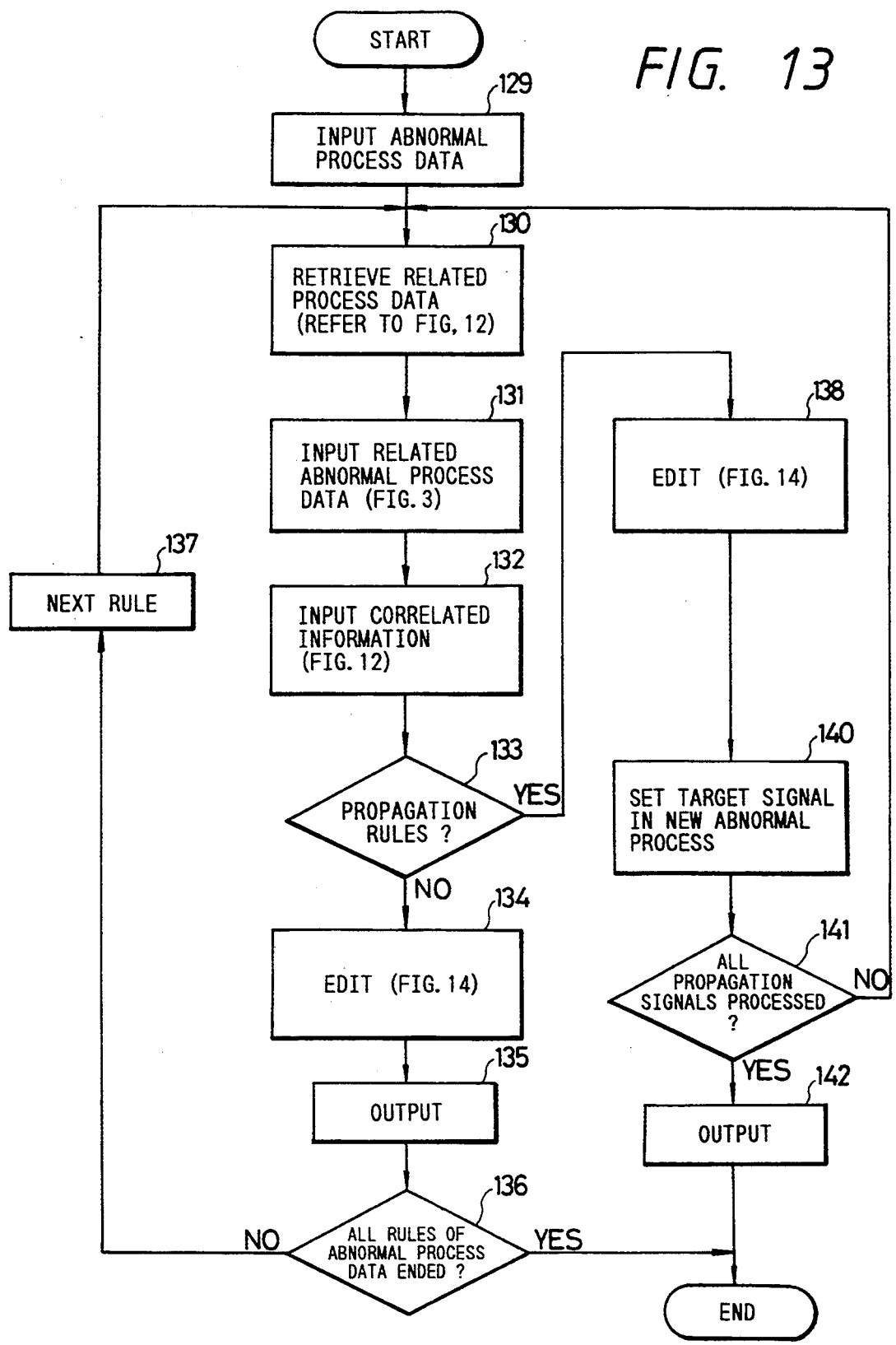
FIG. 13 is a processing flow chart of the knowledge information editor 4.

The processings to be made here are based upon the processing flow chart of FIG. 13. This flow is started when the collection necessity signal 7 is obtained from the knowledge information collection necessity decider (3 of FIG. 1), and the abnormal process data of the collection necessity are inputted (at Block 129). At Block 130, the related process data are retrieved with reference to the Table (of FIG. 12) of the fundamental rule storage (5 of FIG. 1) of the plant. At Block 131, the abnormal process data and the related process data are fetched from the buffer memory (of FIG. 3) in the data input processor (2 of FIG. 1). Incidentally, in case a plurality of rules are set for one abnormal process data, one of them is fetched as the subject. In order to speed up the data fetch with reference to the various memories or tables, the main processes, subprocesses, uniprocesses and devices should be designated at related input signal numbers. For example, the signals of the water-steam process may be designated at the order of 1,000; the signals of the high-pressure heater set or the sub-processes at the order of 1,100; and the signals of the high-pressure heater or the uni-processes at the order of 1,110.

At next Block 132, correlated process data described in the fundamental rules are inputted from the Table (of FIG. 12) by using the abnormal process data as the retrieval signal. The propagating relations described in FIG. 8 are confirmed at Block 133. If NO, editings are executed at Block 134 on the basis of the extracted rules, as will be described hereinafter. At Block 135, the results of editings for the individual rules are individually outputted. At Block 136, it is judged whether or not the editings of all the rules stored in relation to the abnormal process data noted have been ended. If NO, a next rule is set at Block 137, and the processings of the Blocks 130 to 136 are executed again. If YES, on the other hand, the processing of this abnormal process data is ended. If the data of the propagation target and source are stored in the noted rule at the Block 133, the edition (similar to that of the Block 134) of Block 138 is executed, and the propagation target signal is set as new abnormal process data at Block 140. At Block 141, the processings of the Blocks 130 to 133, 138 and 140 are executed for all the propagation signals. At Block 142, the editings relating to the propagations are outputted as a series of results. Thus, it is possible to discriminate the events existing independently of one another and the events relating to one another and to output and grasp the plural influencing events as series ones.

Next, the processing contents of the editing Blocks 134 and 138 will be described in the following. The editings are to measure the time periods between the events occurring in the process data or to detect the occurrences of the extreme values of the process data.

The event of edition will be described in connection with one high-pressure heater (i.e., uni-process) in the high-pressure heater group (i.e., sub-process) in the water-steam process of a thermal power plant in case a bleeder valve for bleeding the high-pressure heater is fully closed by the manual operation of the operator. This operation is generally called the "heater cut". At the Block 129 of FIG. 13, in response to the digital data dictating the full closure of the bleeder valve, the information of the process data name and the correlations relating to the former are acquired from FIG. 12. The fundamental rules around the high-pressure heater are shown in FIG. 11. The rules relating to the bleeder valve opening are the following three rules: the fundamental rules of the device level called the "heater bleeding valve open fully in normal run"; the fundamental rules relating to the influence propagation route, i.e., "propagation source (e.g., the bleeder valve opening, main steam flow and the main steam pressure)—abnormal phenomenon (e.g., the overload run of the generator)—propagation target (e.g., the stator winding temperature of the generator and the thrust differential expansion)"; and the fundamental rules of the "exit/entrance valves open fully and the bypass valve open fully in the abnormal run". In the specific setting method of these three fundamental rules, for the first rules, the normal run is defined in the form of a complementary set of the conditions of the individual cases of conceivable abnormal run. The present case is during the "load run (Gen.MW=0) but not the trip or alarm. The bleeding flow is within a normal range". For the second rules, the overload running state of the plant is thought as one abnormal state, the conceivable cause of which is ruled to the propagation source and the conceivable result of which is ruled to the propagation target. On the other hand, the third rules are made from the standpoint of the openings of the valves corresponding to the running state. Here, the editing according to the first fundamental rules is called the "E1 processing", and the editings according to the second and third fundamental rules are called the "E2 and E3 processings". As a result of the acquisitions and inputs of the various process data from the Blocks 130 to 133 of FIG. 13, the fundamental rules necessary for the E1, E2 and E3 processings are defined and called from the fundamental rule storage 5 to the knowledge information editor 4 of FIG. 1. At this time, the content of the fundamental rules is copied and stored in the working area of the editings so that the process data or the subjects of continuous monitor are accepted. The knowledge information editor 4 is given functions to compute the agings of the individual process data to compare the intrinsic maximum, minimum, maximal and minimal values specified in the fundamental rules always with the measured process data so that the data if deviated are handled as singular data, and to hold the knowledge information in the editor while being edited. Other functions are to present the correlations among the measured data processed in such a form as can be understood by the operator, e.g., the IF-THEN form, or AND (parallel) form, or the framing function to clarify the inclusion of events.

(1) (E1) Processing

The generator has a load and does not perform protections such as a trip or an alarm. For the fundamental rules that the heater bleeding valve is fully open while the heater bleeding flow is within the normal range, the states of the generator load a, the trip contact operating state b, the alarm contact operating state c, the heater bleeding amount d and the heater bleeder valve opening e are collected at the E1 processor in the editor by the full closure of the heater bleeder valve so that their agings are observed.

FIG. 14 is a diagram presenting how the individual process data described in the fundamental rules are changed in a time-series manner. According to the fundamental rules, all data should be at "1". By observing the procedure that the ideal states are not satisfied, the development of the abnormal phenomenon caused by the full closure of the high-pressure heater bleeder valve can be collected as knowledge. Here, the value "1" attached to the individual data a to e of FIG. 14 indicate the following process data, respectively:

a: Generator load higher than a predetermined value - - - 1;
b: Trip contact operation (trip) - - - 1;
c: Alarm contact operation (alarm) - - - 1;
d: Heater bleed more than a predetermined value - - - 1; and
e: Heater bleeder valve more than a predetermined opening - - - 1.

Figures 14A, 14B, 14C:
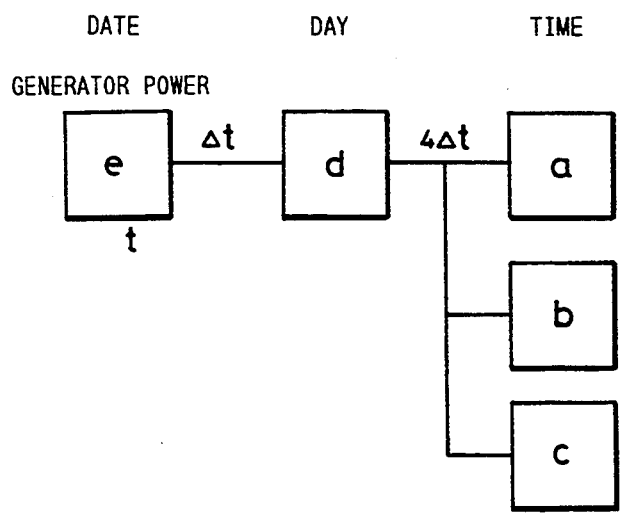
FIGS. 14(a), 14(b) and 14(c) are a diagram showing the time series changes of the data described in the fundamental rules.

FIG. 14(a) enumerates the states of the abnormal process data (i.e., the heater bleeder valve e in this example) and the related process data merely in the time-series manner. Only the data of the time instants of state changes are extracted, as shown in FIG. 14(b), to constitute one knowledge information. The knowledge information generated at this time is expressed as it is in FIG. 14(c): "The heater bleeder valve is not fully open at time t, and the heater bleeding flow is lower after $\Delta t$ than the lower limit of the normal range. After $4\Delta t$, the plant output=0, and the trip contact and the alarm contact are set. Since no state change occurs after Δt', the edition is ended." This information is stored as the knowledge information obtained by the E1 processing, together with the data, day, time and generator power as reference information. The processing of the fundamental rules having no propagation is accomplished at the Block 134 of FIG. 13 and fundamentally in the route of the Blocks 129 to 137.

(2) E2 Processing

Like the E1 processing, the fundamental rules necessary for the E2 processing are sought for and copied in the editor. Here, the abnormal state of the plant is recognized by the load upon the generator (i.e., the generator is loaded by the abnormal process data), and the bleeder valve opening is set as one item for the propagation source of the influence propagation route. If, in this case, the editing start is triggered by the load upon the generator, the causal relations seeking the causes from the change of the phenomenon are specified. In the flow of FIG. 13, the Block 129 is started using the generator load as the abnormal process data, and the series processings of the Blocks 130 to 137 are executed. If the fundamental rules of the propagations are found in the processings, they are processed at the Block 138, and the bleeder valve opening or the propagation source is set at the Block 140 for the subsequent repeating operations. As a result, the output at the Block 142 is the series edited results from the bleeder valve opening to the generator load. In the foregoing example E1, the first cause is the failure of the bleeder valve to be fully open, and the resultant secondary and tertiary phenomena are grasped. Depending upon the setting method of the fundamenaal rules, therefore, the causal relations can be sought for in two ways from both the causes and results.

If the heater bleeder valve opening of the first cause is gradually directed from the full open to closed states, the editing is started when the generator load exceeds the threshold value of the knowledge information necessity at some time. Thus, the knowledge information to be generated by E2 is that "the generator load is caused to rise X % or more by the closure of the bleeder valve so that the stator winding temperature of the generator also rises".

In the example E1, the input signal is a digital data and a state changing signal, and the mutual time relations are noted for the edition. If the analog signal is included as in the example E2, the size and ratio of the analog data when there occurs an event (such as the state change or the deviation of the analog data from a predetermined value) are attained as one knowledge.

(3) E3 Processing

Like the E1 and E2 processings, the fundamental rules necessary for the E3 processing are sought for, and the abnormal run is defined, at this time, as the full closure of the bleeder valve in a loaded run while considering the heater cut operation. At this time, the time periods from the full closure of the bleeder valve to the full closure of the heater inlet/outlet values and the full opening of the heater bypass valve are so short that the knowledge information editor may be incapable of extracting the state changes. At this time, what is obtained is the knowledge information that the abnormal state is continuing. This is the information extracted because the process data has no state change due to the dependency upon the order of the required operation time. The cause and results of the changes can also be grasped by fetching the process data based upon the backward operations of the supply device.

By the processings E1, E2 and E3, at least three knowledge informations are generated, as described above. Since these have a common event as their origin, there relatively arises a difference in the qualities of the knowledge informations. As the case may be, a complementary knowledge information may hold so that it cannot be simply judged and automatically selected. When all the informations cannot be inputted to the knowledge data base, their quality can be improved by adding the judgement of the operator.

V: Knowledge Information Adder 8

Figure 15:
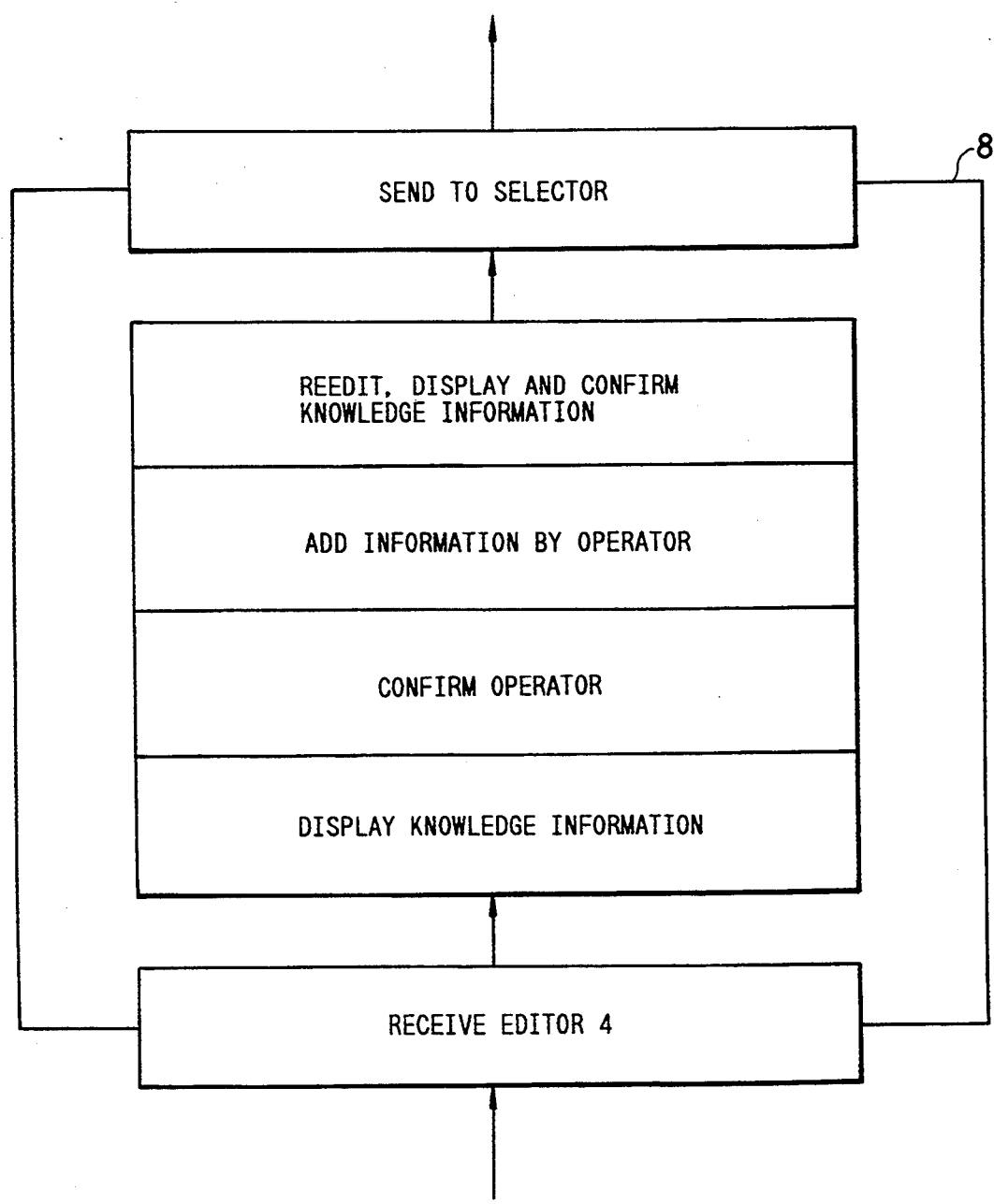
FIG. 15 is a processing flow chart showing the knowledge information adder 8.

The running knowledge information generated in the procedures until IV can be directly stored in the knowledge data base 11. The adder 8 is provided for the corrections, supplementations and additions by the operator for the information generated automatically. In the information adder 8 shown in FIG. 1, the additional information 14 is inserted in the following manner. As shown in FIG. 15, for example, the running knowledge information from the information editor 4 is displayed in the display such as the CRT so that the additional operation and the recognition result may be displayed in the case of the content confirmation and additional information by the operator. Another storage function is to call and recorrect the old and new knowledge informations arbitrarily until the operator issues a transmission command to the processing function of the subsequent step, while the operator is correcting.

The necessity for this function will be described as follows. The running knowledge information generated in the procedure until the editing step IV is stored together with the major parameter such as the generation time or the load and the additional information such as the number of generation times in the running knowledge data base. Since, at this time, the automatically generated knowledge information should follow the initially inputted conditions (e.g., the conditions for generation the fundamental rules), it is necessary to manually input the reflections which are reminded by the operator. When the operator manipulates the auxiliary machinery, this manipulation may not be discriminated from the plant malfunction by the recognition at the side of the present automatic knowledge information generating system. It is also necessary for the operator to modify the generated knowledge information. Thus, the quality of the knowledge information is improved by adding the step of manually modifying the automatically generated information to the procedure of the knowledge information generation.

In order to add the functions described above, the present system is equipped with: a display such as a CRT for displaying the automatically generated knowledge information to the operator to confirm the content of the knowledge information; and a control member such as a keyboard for inputting the additional information of the operator to the information content. After this, the added and corrected knowledge information can be redisplayed and recorrected so that its content is sent, after confirmed, to the unit of the subsequent function, i.e., the knowledge information selector of the present system.

The knowledge addition will be specified in the following. The high-pressure heater of the thermal power plant is exemplified by the case in which the operator fully closes the bleed shut-off valve while intending the run without the high-pressure heater. At this time, the present automatic knowledge information generating system recognizing the state change of the full valve closure starts both the latch of the process data with reference to the fundamental rules and the knowledge information generations. If, at this time, the change of the process data corresponding to the manual operations is not incorporated into the fundamental rules, what is obtained as the knowledge information is either the knowledge of the causal relations of the event caused the full valve closure or the knowledge information, i.e., the manipulation or one item of the influence propagation source of the fundamental rules relating to the influence propagation route, but the definite elements such as the manipulations cannot be incorporated into the knowledge information. For the operator, on the other hand, the change of the process data based upon his own manipulations is accepted as a clear fact. It is, therefore, possible at the present information adder 8 to add the content that "the following process data change is caused as a result of the manipulation" to the automatically generated knowledge information. Another event is exemplified by the case in which the knowledge information is that "If the heater bleeder valve is closed during the normal run, the operation is changed to an abnormal state so that the generator output is increased and that the heater supply water temperature drops." If the operator knows that the cause for the heater bleeder valve closure comes from the malfunction based on the disorder of the controller, the operator adds one element block constituting the knowledge information that "the heater bleeder valve is brought out of order by the malfunction of the controller." to the CRT display. As a result, there can be attained as the added and corrected knowledge information the content that "The controller goes out of order during the normal run so that the heater bleeder valve is erroneously closed to increase the generator output and drop the heater supply water temperature".

VI: Knowledge Information Selector 9

Figure 16:
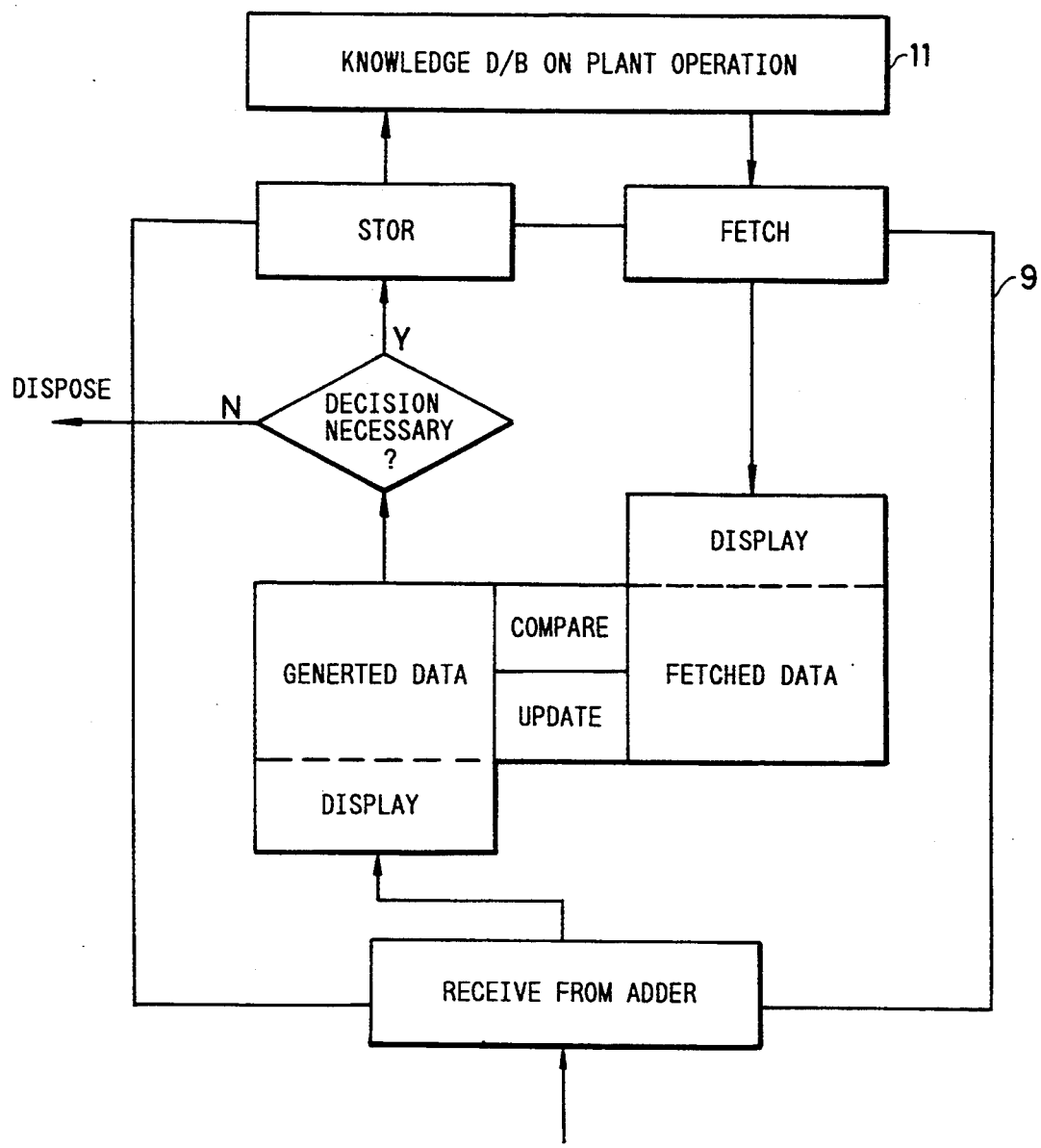
FIG. 16 is a processing flow chart showings the knowledge information selector 9.

It is assumed that the confirmation of the generated knowledge information by the operator is ended at the procedure V and that the knowledge information is qualified to be stored and constituted in the knowledge data base. In the case of the plant of long operation period, the knowledge information stored already may contain the same or similar one just generated. Some one has no meaning to be newly registered in the data base. Therefore, the content of the plant operation knowledge data base has to be freely called so that it may be compared and examined with the knowledge information sent from the present knowledge information selector 9. As to the knowledge information existing in the data base and containing the individual process data constituting the newly generated knowledge information, there is needed a function to call the knowledge information automatically to the CRT display for comparison. As shown in FIG. 16, therefore, the knowledge information selections are accomplished with: the display function of the newly generated knowledge information on the CRT or the like; the simultaneous display function of the knowledge information of the data base; the function of comparing the two; the updating function of the additional information to the knowledge information; the selective latch function of the knowledge information; the extraction function from and the latch function from the data base, and the elimination function. Here, the updating function of the additional information to the knowledge information is necessary for updating or latching the knowledge information existing in the data base, when it is sufficient to administer the latest generation timing of the knowledge information or the number of the same knowledge information generations, in case the content of the generated knowledge information is identical to the knowledge information existing in the data base.

Next, in the example around the high-pressure heater of the thermal power plant, if the event of the heater drain valve fully opened in an abnormal operation of high heater water level constitutes a portion of one knowledge information, there arises no problem in case the running state of the plant then restores its normal state. In case the hysteresis of fully opening the drain valve is to be referred to clarify the cause for and aid in making counter-measures for the turbine water inductions, the number of fully opening the drain valve and the maximum value of the full open period are registered as the additional one of the knowledge information and are updated for the identical knowledge information generation.

VII: Fundamental Rule Information Processor 10

The knowledge information to be stored in the knowledge data base 11 is classified into two classes according to its generation method. One is generated by the present automatic knowledge information generating system 20, and the other is generated and inputted to the knowledge data base in advance by means other than the present system. The knowledge information of the latter class may not be present in the least. The present system is made so flexible as to follow the consistency as a whole while allowing the rational fundamental rules from the knowledge information. The system improves the initially set fundamental rules automatically to improve the quality of the knowledge information stored in the data base finally. Specifically, the present fundamental rule information processor 10 selects the out-of-date ones of the initially set fundamental rules, extracts the laws and causal relations of the knowledge information stored in the data base by the information retrieval, and compares and checks the extracted result and the existing fundamental rules.

Figure 17:
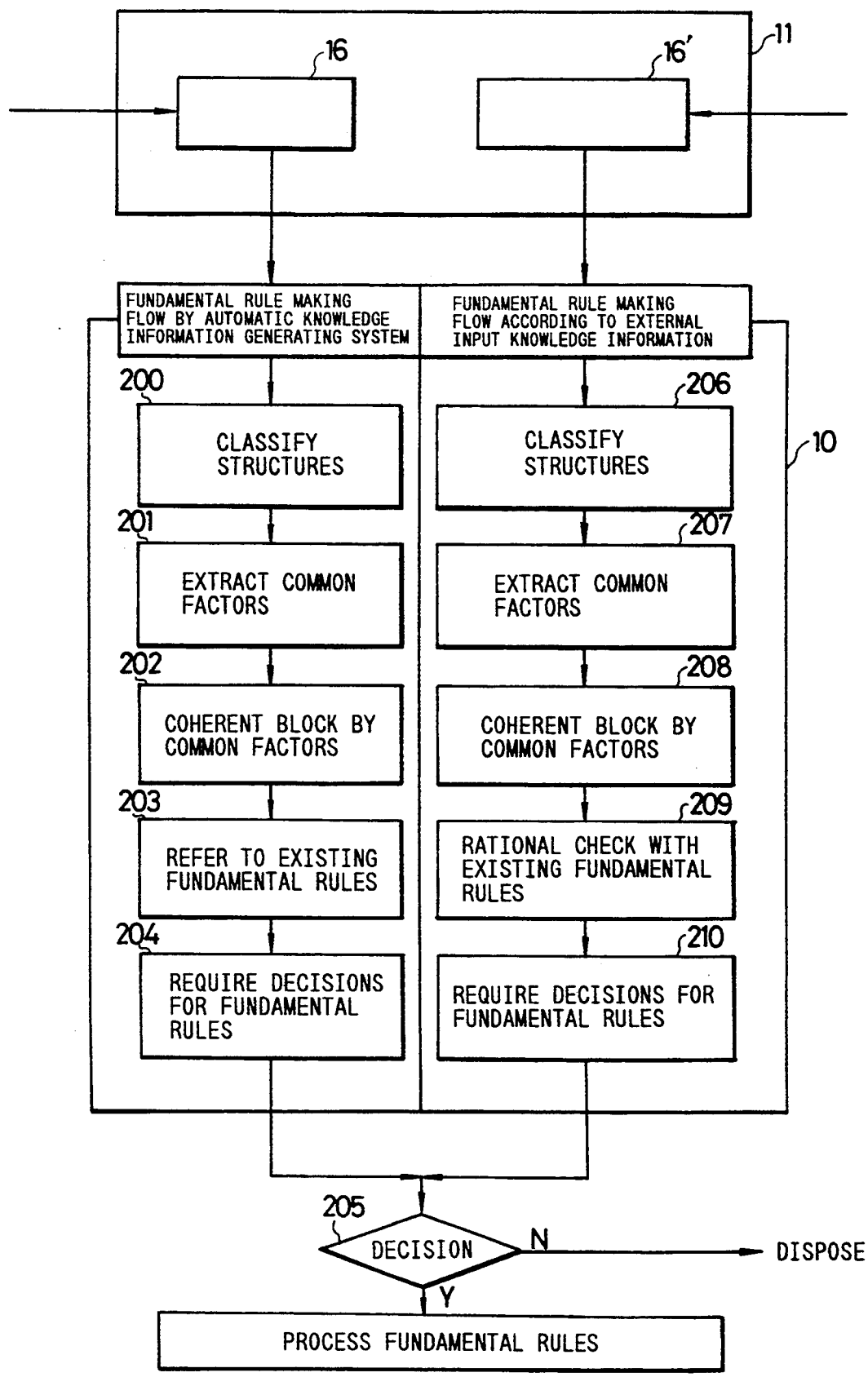
FIG. 17 is a processing flow chart of the fundamental rule information processor 10.

FIG. 17 shows one example of the processing method of the fundamental rule information processor 10. FIG. 17 schematically presents the procedures in case the fundamental rules are to be reversely generated from the knowledge information 16, which is generated by the process data edition referring to the fundamental rules, and the knowledge information 16' which is inputted from the outside.

a) Knowledge Information 16 Generated by Present Automatic Knowledge Information Generating System 20

Since the plant running knowledge information 16 is generated by the present system 20 basically with reference to the initially set fundamental rules, none of the fundamental rules exceeding the initially set ones are caused in case the information is not worked by the operator. In other words, the simplification and integration of the rules are possible, but rules of different contents are not generated without contradiction to the existing rules. In short, fundamental rules having new meanings can be produced for the knowledge information which is generated as a result of the information working by the operator.

The procedure for generating the new fundamental rules in this case will be described in the following. First of all, as shown in FIG. 17, the knowledge information 16 in the knowledge data base is monitored (at Block 200) at all times or for a predetermined period in connection with the structural similarity of the knowledge information. The structure of the knowledge information is made by connecting a plurality of unit blocks, the connections (series or parallel) and inclusions (for each system section) of which are monitored. In case the knowledge information is constructed of three or more unit blocks, the structural similarity is additionally retrieved in case one arbitrary block is deficient. A hint is sought for generating the fundamental rules from the viewpoint that the block structure is not identical as a whole but is similar in a portion. In the structure classifying mechanism described above, the similarity is checked, and the structural similarities are grouped to count the number and frequency of the groups. This counting operation is necessary for judging whether the fundamental rules are worth setting or stored as the knowledge information of the special case. This comparison is accomplished by giving a predetermined value in advance.

After it has been confirmed that the requisites for the fundamental rules in the structural classifications, the intensive works and the number and frequency of the knowledge information are satisfied, the common factors are extracted (at 201) for each group, and coherent blocks are made (at 202) by the common factors. These common factors need not be common through the groups but may be those in a plurality of coherent blocks. Unless the fundamental rule judging portion by the operator is provided, the frequency examination has to be accomplished again to make one of the fundamental rules. After this, each coherent block is referred (at 203) to the content of the existing fundamental rules. This is to confirm the difference between the generating procedure of the knowledge information generated by the automatic knowledge information generating system 20 and the existing fundamental rules because the former comes from the latter. This difference, i.e., the final condition for satisfying the new fundamental rules can be obtained by checking the resultant fundamental rules only.

After the ends of the processings at the aforementioned individual stages, a signal for requiring the decisions for the fundamental rules is produced (at 204) so that the decisions may be assigned to the operator. These decisions are accomplished by partially correcting or confirming the candidates for new fundamental rules in the display such as a CRT and constitute the root of the present system for automatically generating the plant running knowledge information. The decisions are desirably consulted by a plurality of operators for running the plant.

b) Knowledge Information Stored by External Input

The knowledge information stored in the knowledge data base by the external input is based upon the prerequisite that its content is wholly true, and is sought for the fundamental rules. Basically, like the case a), the works of classifying the structures (at 206) of the block elements, grouping, extracting the common factors (at 207) of the knowledge information in the structures of the same kind, coherent blocking (at 208) by the common factors, and counting the frequencies. Because of the knowledge information inputted from the outside, however, the rational check with the existing fundamental rules have to be accomplished unlike the case (I). It is the best to check the rationality of the whole knowledge information externally inputted at the instant when it is stored in the knowledge data base. Since the automatic knowledge information generating system may be started after the external input, the present fundamental rule information processor is given the rationality checking function. The knowledge informations in the knowledge data base raise no problem even if they have contradictory contents because they exert no influence on each other. When the knowledge informations are to be used for making the fundamental rules as in the present processor, the contradiction will raise serious adverse influences, and the erroneous knowledge should be prevented in advance. In case the externally inputted knowledge informations cannot always be assumed to be true, it is necessary, as described above, to check the rationalities of all of the knowledge informations with the initially set fundamental rules. For this necessity, the rationality checking function of the present fundamental rule information processor with the existing fundamental rules is enlarged as pre-processing at the instant of the external input of the knowledge data base.

The knowledge information, which has been edited and generated with reference to the initially set fundamental rules, is stored in the knowledge data base. As this storage increases, a new fundamental rule making operation functions so that the fundamental rule portion grows.

The high-pressure heater of the thermal power plant is taken up as a specific example. A number of knowledge informations relating to that "if the heater bleeder valve is closed in the normal operation, the operation turns abnormal, and the generator output may resultantly increase to drop the heater supply water temperature." are generated and stored in the knowledge data base, and their structural similarities are then monitored. These knowledge informations have an omission of their one component block "the generator output may increase", in the case of throttling the generator output automatically, and an addition of the content of the operator's operation that "the load limiting mode when the heater cut operation is selected" as their one component block. If the following factors are extracted in the common factor extracting procedures:

(A) "The heater cut operation is selected to establish the load limiting mode";

(B) "The heater bleeder valve is fully closed to shift the run to the abnormal one";

(C) "The heater water supply temperature drops"; and (D) "The plant efficiency drops", then these coherent factors provide one candidate for the fundamental rules. After it has been confirmed that there is no identical one in the existing rules, the request for judging the fundamental rules is issued to the operator. The operator confirms the content through the display such as the CRT and stores the item (B), from which the content "abnormal" is omitted, as the fundamental rules. The resultant fundamental rules have the content that "In case the heater cut operation is selected, the load limiting mode comes into to fully close the heater bleeder valve so that the heater supply water temperature is dropped together with the plant efficiency."

Figure 18:
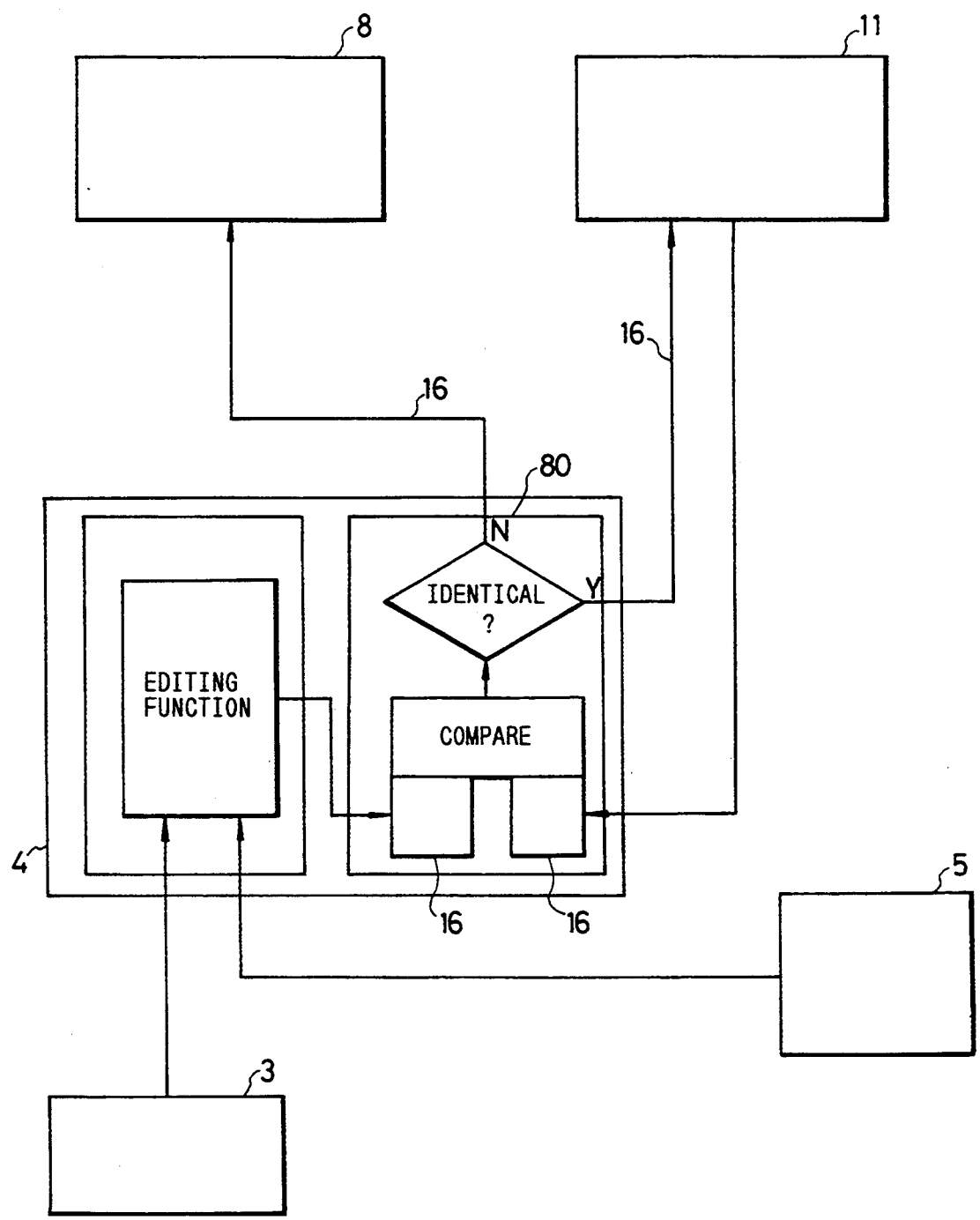
FIG. 18 is a block diagram for explaining the editings using the knowledge information in the data base.

VIII: Referring Function of Knowledge Information Editings using Knowledge Information in Knowledge Data Base This is a function to merely store the knowledge information, which is latched in the plant running knowledge data base, or is utilized for the editings described in the section IV in addition to the function to generate the fundamental rules newly as in the section VII. In this function, the knowledge information generated after the editings and the knowledge information in the knowledge data base are compared. If this comparison reveals the identity, the function is to update only the additional information portion and store it in the data base or to dispose it. If different, the procedure follows the normal processing route, and the storage is made in the data base through the adding and selecting operations of the operator. This function is effective if the main purpose is to lighten the operational troubles of the operator. FIG. 18 shows an example of the structure in which the above-specified function is added to the knowledge information editor. In the high-pressure heater of the thermal power plant, for example, in case the generation result of the knowledge information in the case of transfer to the heater cut operation is identical to that of the preceding generation, only the additional information is updated and stored directly in the data base.

Industrial Applicability

According to the present invention, the knowledge information can be acquired with ease by preparing the correlations and causal relations among the process data as the fundamental rules and by giving the information noting the events of the process data detected.

We claim:

1. A knowledge information generating system comprising:
   means for storing, for each of first process data indicating a current state of a subject of control to be monitored, second process data related to said first process data and fundamental rules indicating relations between said first and second process data, said second process data representing previously collected information concerning previous states of said subject of control;
   means for fetching said fundamental rules based on said first process data indicating that a current state of the subject of control is abnormal; and
   means for generating knowledge information to be used to operate said subject of control based on said fetched fundamental rules, said first process data input from said subject and said second process data.

2. A knowledge information generating system comprising:
   a fundamental rule storage device for storing, for each of first process data indicating a current state of a subject of control to be monitored, second process data related to said first process data and fundamental rules indicating relations between said first and second process data, said second process data representing previously collected information concerning previous states of said subject of control;
   a process data input processor for inputting said first process data from said subject of control;
   a knowledge information collection necessity decider for deciding whether process data for knowledge information generation is to be collected by detecting whether said first process data input by said process data input processor has either changed from a normal state or deviated from a predetermined relation between said first process data and said second process data beyond a preset threshold value and outputting a necessary signal when it is detected that said first process data has either changed or deviated;
   a knowledge information editor for fetching said fundamental rules and said process data from said fundamental rule storage device in response to said necessary signal, editing said process data based on relations between said first process data input by said process data input processor and said second process data indicated by said fundamental rules, and generating knowledge information for use in operating said subject of control based on said edited second process data; and
   a knowledge data base for storing said knowledge information generated by said knowledge information editor.

3. A knowledge information generating system comprising:
   a fundamental rule storage device for storing, for each of first process data indicating a current state of a subject of control, second process data related to said first process data and fundamental rules indicating relations between said first and second process data, said second process data representing previously collected information concerning previous states of said subject of control;
   a process data input processor for inputting first process data from said subject of control;
   a knowledge information collection necessity decider for deciding whether process data for knowledge information generation is to be collected by detecting whether said first process data input by said process data input processor has either changed from a normal state or deviated from a predetermined relation between said first process data and said second process data beyond a preset threshold value and outputting a necessary signal when it is detected that said first process data has either changed or deviated;
   a knowledge information editor for fetching said fundamental rules and said process data from said fundamental rule storage device in response to said necessary signal, editing said process data based on relations between said first process data input by said process data input processor and said second process data indicated by said fundamental rules, and generating knowledge information for use in operating said subject of control based on said edited second process data;
   an information adder for adding additional information input by an operator to said knowledge information generated by said knowledge information editor;
   a knowledge data base for storing generated knowledge information and said additional information input by said operator; and
   a fundamental rule information processor for correcting said fundamental rules, and storing said corrected fundamental rules in said fundamental rule storage device.

4. A fundamental rule correcting method comprising the steps of:
   storing, for each of first process data indicating a current state of a subject of control to be monitored, second process data related to said first process data and fundamental rules indicating relations between said first and second process data, said second process data representing previously collected information concerning previous states of said subject of control;

extracting from first process data input from said subject of control, pairs of first process data having state values indicating a relation between said pair of first process data representing a physical quantity flow of said subject of control;

comparing said extracted pairs of first process data to related pairs of second process data indicated by said fundamental rules; and correcting fundamental rules based on said extracted pairs of first process data and said related paris of second process data.

5. A fundamental rule correcting method comprising the steps of:

storing, for each of first process data indicating a current state of a subject of control to be monitored, second process data related to said first process data and fundamental rules indicating relations between said first and second process data, said second process data representing previously collected information concerning previous states of said subject;

extracting from first process data input from a subject of control, pairs of first process data having state values indicating a functional relation between said pairs of first process data;

comparing said extracted pairs of first process data to related pairs of second process data indicated by said fundamental rules; and correcting said fundamental rules based on said extracted pairs of first process data and said related pairs of second process data.

6. A fundamental rule correcting method comprising the steps of:

storing, for each of first process data indicating a current state of a subject of control to be monitored, second process data related to said first process data and fundamental rules indicating relations between said first and second process data, said second process data representing previously collected information concerning previous states of said subject of control;

extracting, from first process data input from said subject of control, pairs of first process data having state values indicating a source and target relation between said pairs of first process data representing an influence propagation route of a physical quantity of said subject of control;

comparing said extracted pairs of first process data and said second process data based on said fundamental rules; and correcting said fundamental rules based on extracted pairs of first process data and related pairs of second process data.

7. A fundamental rule correcting method comprising the steps of:

storing, for each of first process data indicating a current state of a subject of control to be monitored, second process data related to said first process data and fundamental rules indicating relations between said first and second process data, said second process data representing previously collected information concerning previous states of said subject of control;

extracting, from first process data input from said subject of control, pairs of first process data having state values indicating operational relations between a running state of said subject of control and an operating state of auxiliary equipment of said subject of control;

comparing said extracted pairs of first process data to related pairs of second process data indicated by said fundamental rules; and correcting said fundamental rules based on said extracted pairs of first process data and said related pairs of second process data.

8. An expert system for controlling a subject of control by using knowledge information effective for running said subject of control, comprising:

means for storing, for each of first process data indicating a current state of a subject of control to be monitored, second process data related to said first process data of said subject of control and fundamental rules indicating relations between said first process data and said second process data, said second process data representing previously collected information concerning previous states of said subject of control;

means for inputting first process data from said subject of control when said subject of control is running;

means for generating knowledge information based on said inputted first process data, said second process data and said fundamental rules;

means for displaying said generated knowledge information for viewing by an operator of said subject of control; and means for applying said generated knowledge information to a controller for controlling the running of said subject of control.

9. A logger system for outputting knowledge information for use in controlling a subject of control, comprising:

means for storing, for each of first process data indicating a current state of a subject of control to be monitored, second process data related to said first process data and information indicating relations between said first and second process data as fundamental rules, said second process data representing previously collected information concerning previous states of said subject of control;

means for fetching said fundamental rules based on said first process data indicating that a current state of the subject of control is abnormal;

means for obtaining knowledge information, which includes time data indicating time periods between change of said first process data, based on said fetched fundamental rules and said second process data; and means for outputting said obtained knowledge information in a predetermined interval and on demand.

* * * * *